(12) United States Patent
Yaghi et al.

(10) Patent No.: US 7,799,120 B2
(45) Date of Patent: Sep. 21, 2010

(54) METAL-ORGANIC FRAMEWORKS WITH EXCEPTIONALLY HIGH CAPACITY FOR STORAGE OF CARBON DIOXIDE AT ROOM-TEMPERATURE

(75) Inventors: Omar M. Yaghi, Los Angeles, CA (US); Andrew Robert Millward, Longmont, CO (US)

(73) Assignee: The Regents of the University of Michigan, Ann Arbor, MI (US)

( * ) Notice: Subject to any disclaimer, the term of this patent is extended or adjusted under 35 U.S.C. 154(b) by 752 days.

(21) Appl. No.: 11/527,232

(22) Filed: Sep. 26, 2006

(65) Prior Publication Data
US 2007/0068389 A1 Mar. 29, 2007

Related U.S. Application Data

(60) Provisional application No. 60/720,439, filed on Sep. 26, 2005.

(51) Int. Cl.
*B01D 53/02* (2006.01)

(52) U.S. Cl. .............................. 96/148; 96/108; 96/147; 95/90; 95/91; 95/92; 95/148; 95/903; 423/230; 206/0.7; 252/184

(58) Field of Classification Search ........... 96/108–154; 95/90–148, 900–903; 502/401; 206/0.7; 252/184; 423/230
See application file for complete search history.

(56) References Cited

U.S. PATENT DOCUMENTS

| | | | |
|---|---|---|---|
| 3,144,418 A | 8/1964 | Hill et al. | |
| 4,359,327 A | 11/1982 | Armand et al. | |
| 5,629,523 A | 5/1997 | Ngo et al. | |
| 5,648,508 A | 7/1997 | Yaghi | |
| RE35,908 E | 9/1998 | Kitaguchi et al. | |
| 5,862,796 A | 1/1999 | Seki et al. | |
| 5,880,471 A | 3/1999 | Schelten et al. | |
| 5,940,460 A | 8/1999 | Seidel et al. | |
| 6,072,181 A | 6/2000 | Hassard et al. | |
| 6,113,673 A | 9/2000 | Loutfy et al. | |
| 6,309,446 B1 * | 10/2001 | Nakanoya et al. | ............. 95/102 |

(Continued)

FOREIGN PATENT DOCUMENTS

CA 2 387 122 2/2001

(Continued)

OTHER PUBLICATIONS

U.S. Appl. No. 10/270,642, filed Oct. 16, 2002, Mueller et al.

(Continued)

*Primary Examiner*—Jason M Greene
*Assistant Examiner*—Dung Bui
(74) *Attorney, Agent, or Firm*—Brooks Kushman P.C.

(57) ABSTRACT

A carbon dioxide storage system includes a container and a conduit attached to the container for introducing or removing a carbon dioxide-containing composition from the container. A carbon dioxide storage material is positioned within the container. The carbon dioxide-storage material includes a metal-organic framework, which has a sufficient surface area to store at least 10 carbon dioxide molecules per formula unit of the metal-organic framework at a temperature of about 25° C.

23 Claims, 8 Drawing Sheets

U.S. PATENT DOCUMENTS

| | | | |
|---|---|---|---|
| 6,312,902 | B1 | 11/2001 | Shultz et al. |
| 6,348,607 | B1 | 2/2002 | Müller et al. |
| 6,479,680 | B1 | 11/2002 | Bassler et al. |
| 6,479,826 | B1 | 11/2002 | Klann et al. |
| 6,491,740 | B1 * | 12/2002 | Wang et al. ............... 95/90 |
| 6,518,441 | B2 | 2/2003 | Grosch et al. |
| 6,545,281 | B1 | 4/2003 | McGregor et al. |
| 6,617,467 | B1 | 9/2003 | Mueller et al. |
| 6,624,318 | B1 | 9/2003 | Mueller et al. |
| 6,727,371 | B2 | 4/2004 | Walch et al. |
| 6,893,564 | B2 | 5/2005 | Mueller et al. |
| 6,929,679 | B2 | 8/2005 | Muller et al. |
| 6,930,193 | B2 | 8/2005 | Yaghi et al. |
| 6,965,026 | B2 | 11/2005 | Zaworotko et al. |
| 7,008,607 | B2 | 3/2006 | Muller et al. |
| 7,119,219 | B2 | 10/2006 | Muller et al. |
| 7,481,866 | B2 * | 1/2009 | MacGillivray et al. ......... 95/90 |
| 7,517,396 | B2 * | 4/2009 | Arnold et al. ................ 96/126 |
| 2003/0078311 | A1 | 4/2003 | Muller et al. |
| 2003/0148165 | A1 * | 8/2003 | Muller et al. ................. 429/34 |
| 2004/0014598 | A1 * | 1/2004 | Kitagawa et al. ............ 502/150 |
| 2004/0110950 | A1 | 6/2004 | Li et al. |
| 2004/0225134 | A1 | 11/2004 | Yaghi et al. |
| 2004/0265670 | A1 | 12/2004 | Mueller et al. |
| 2005/0124819 | A1 * | 6/2005 | Yaghi et al. ................. 556/148 |
| 2005/0230415 | A1 * | 10/2005 | Forgac et al. ................ 222/1 |
| 2006/0051638 | A1 * | 3/2006 | Gross .......................... 429/26 |
| 2006/0054022 | A1 * | 3/2006 | Hosoe et al. ................. 96/108 |
| 2009/0000474 | A1 * | 1/2009 | MacGillivray ................ 95/90 |

FOREIGN PATENT DOCUMENTS

| | | |
|---|---|---|
| CA | 2 414 756 | 1/2003 |
| CA | 2 414 779 | 1/2003 |
| DE | 44 08 772 | 9/1994 |
| DE | 197 23 950 | 12/1998 |
| DE | 198 35 907 | 2/2000 |
| DE | 198 47 629 | 4/2000 |
| DE | 199 36 547 | 2/2001 |
| DE | 100 15 246 | 10/2001 |
| DE | 100 32 884 | 1/2002 |
| DE | 100 32 885 | 1/2002 |
| DE | 101 11 230 | 9/2002 |
| DE | 101 43 195 | 3/2003 |
| EP | 00 557 116 | 8/1993 |
| EP | 0 727 608 | 8/1996 |
| EP | 0 790 253 | 8/1997 |
| EP | 1 280 090 A1 | 1/2003 |
| JP | 2004024247 | 1/2004 |
| WO | WO 97/46711 | 12/1997 |
| WO | WO 99/05151 | 2/1999 |
| WO | WO 00/78837 | 12/2000 |
| WO | WO 01/16209 | 3/2001 |
| WO | WO 01/27186 | 4/2001 |
| WO | WO 02/070526 | 9/2002 |
| WO | WO 02/088148 | 11/2002 |
| WO | WO 03/035717 | 5/2003 |
| WO | WO 03/044228 A1 | 5/2003 |

OTHER PUBLICATIONS

U.S. Appl. No. 10/611,863, filed Jul. 3, 2003, Mueller et al.
U.S. Appl. No. 10/983,629, filed Nov. 9, 2004, Hesse et al.
Bondi, A., "van der Waals Volumes and Radii," Journal of Phys. Chem., Mar. 16, 1964, vol. 68, No. 3, pp. 441-451.
Bennett, J.M. and J.V. Smith, "Positions of Cations and Molecules in Zeolites with the Faujastie-Type Framework I. Dehydrated Ca-Exchanged Faujasite," Mat. Res. Bull., vol. 3, No. 8, 1968, pp. 633-642.
Hoskins, B.F. and R. Robson, "Infinite Polymeric Frameworks Consisting of Three Dimensionally Linked Rod-Like Segments," J. Am. Chem. Soc., 1989, vol. 111, pp. 5962-5964.
Fagan, P.J. and M.D. Ward, "Building Molecular Crystals," Sci. Am., Jul. 1992, pp. 48-54.
Stein, A., S.W. Keller and T.E. Mallouk, "Turning Down the Heat, Design and Mechanism in Solid-State Synthesis," Mar. 12, 1993, vol. 259, pp. 1558-1564.
Russell, V.A., C.C. Evans, W.Li and M.D. Ward, "Nanoporous Molecular Sandwiches: Pillard Two-Dimensional Hydrogen-Bonded Networks with Adjustable Porosity," Science, Apr. 25, 1997, vol. 276, pp. 575-579.
Husing, N. and U. Schubert, "Aerogels-Airy Materials: Chemistry, Structure, and Properties," Agnew. Chem. Int. Ed., 1998, vol. 37, pp. 22-45.
Menon, V.C. and S. Komarneni, "Porous Adsorbents for Vehicular Natural Gas Storage: A Review," J. of Porous Materials, 1998, vol. 5, pp. 43-58.
Jones, C.W., K. Tsuji and M.E. Davis, "Organic-Functionalized Molecular Sieves as Shape-Selective Catalysts," Nature, May 7, 1998, vol. 393, pp. 52-54.
Fujita, M., "Self-Assembly of [2]Catenanes Containing Metals in Their Backbones," Accounts of Chemical Research, 1999, vol. 32, No. 1, pp. 53-61.
Li, H., M. Eddaoudi, M. O'Keeffe and O.M. Yaghi, "Design and Synthesis of an Exceptionally Stable and Highly Porous Metal-Organic Framework," Nature, Nov. 18, 1999, vol. 402, pp. 276-279.
Li, H., C.E. Davis, T.L. Groy, D.G. Kelley and O.M. Yaghi, Coordinately Unsaturated Metal Centers in the Extended Porous Framework of $Zn_3$ (BDC) $_3$ ;•$6CH_3OH$ (BDC=1, 4-Benzenedicarboxylate), J. Am. Chem. Soc., 1998, vol.120, pp. 2186-2187.
Kiang, Y.-H, G.B. Gardner, S. Lee, Z. Xu and E.B. Lobkovsky, "Variable Pore Size, Variable Chemical Functionality, and an Example of Reactivity Within Porous Phenylacetylene Silver Salts," J. Am. Chem. Soc., 1999, vol. 121, pp. 8204-8215.
Eddaoudi, M., H. Li and O.M. Yaghi, "Highly Porous and Stable Metal-Organic Frameworks: Structure Design and Sorption Properties," J. Am. Chem. Soc., 2000, vol. 122, pp. 1391-1397.
Noro, S., S. Kitagawa, M. Kondo and K. Seki, "A New, Methane Adsorbent, Porous Coordination Polymer [{$CuSiF_6$(4,4-bipyridine)$_2$}$_n$]," Angew. Chem. Int. Ed., 2000, vol. 39, No. 12, pp. 2081-2084.
Yaghi, O.M., M. O'Keeffe and M. Kanatzidis, "Design of Solids from Molecular Building Blocks: Golden Opportunities for Solid State Chemistry," J. Solid State Chem., 2000, vol. 152, pp. 1-2.
Reineke, T.M., M. Eddaoudi, D. Moler, M. O'Keeffe and O.M. Yaghi, "Large Free Volume in Maximally Interpenetrating Networks: The Role of Secondary Building Units Exemplified by $Tb_2(ADB)_3[CH_3]_2SO]_416[(CH_3)_2SO]^1$," J. Am. Chem. Soc., 2000, vol. 122, pp. 4843-4844.
Eddaoudi, M., D.B. Moler, H. Li, B. Chen, T.M. Reineke, M. O'Keeffe and O.M. Yaghi, "Modular Chemistry: Secondary Building Units as a Basis for the Design of Highly Porous and Robust Metal-Organic Carboxylate Frameworks," Acc. Chem. Res., 2001, vol. 34, pp. 319-330.
Seki, K., "Design of an Adsorbent with an Ideal Pore Structure for Methane Adsorption Using Metal Complexes," Chem. Commun., 2001, 1496-1497.
Kim, J., B. Chen, T.M. Reineke, H. Li, M. Eddaoudi, D.B. Moler, M. O'Keeffe and O.M. Yaghi, "Assembly of Metal-Organic Frameworks from Large Organic and Inorganic Secondary Building Units: New Examples and Simplifying Principles for Complex Structures," J. Am. Chem. Soc., 2001, vol. 123, pp. 8239-8274.
Guillou, N., Q. Gao, P.M. Forster, J. Chang, M. Norgues, S. Park, G. Ferey and A.K. Cheetham, "Nickel(ii) Phosphate VSB-5: A Magnetic Nanoporous Hydrogenation Catalyst with 24-Ring Tunnels," Angew. Chem. Int. Ed., 2001, vol. 40, No. 15, pp. 2831-2834.
Naumov, P., G. Jovanovski, M. Ristova, I.A. Razak, S. Cakir, S. Chantrapromma, H. Fun and S. Weng Ng, "Coordination of Deprotonated Saccharin in Copper(II) Complexes. Structural Role of the Saccharinate Directed by the Ancillary N-heterocyclic Ligands," Z. Anorg. Allg. Chem., 2002, vol. 628, pp. 2930-2939.
Wallner, H. and K. Gatterer, "Growth of Pure Ni $(OH)_2$ Single Crystals from Solution—Control of the Crystal Size," Z. Anorg. Allg. Chem., 2002, vol. 628, pp. 2818-2820.

Patoux, S. and C. Masquelier, "Lithium Insertion into Titanium Phosphates, Silicates and Sulfates," Chemistry of Materials, 2002, vol. 14, No. 12, pp. 5057-5068.

Rosi, N., M. Eddaoudi, J. Kim et al., "Infinite Secondary Building Units & Forbidden Catenation in Metal-Organic Frameworks", Angew. Chem. Int. Ed., 2002, 41, No. 2, pp. 284-285.

Eddaoudi, M., J. Kim, N. Rosi et al., "Systematic Design of Pore Size & Functionality in Isoreticular MOFs & Their Application in Methane Storage", Science, vol. 295, Jan. 18, 2002, pp. 469-472.

Seki, K., "Surface Area Evaluation of Coordination Polymers Having Rectangular Micropores", Langmuir 2002, 18, pp. 2441-2443.

Seik, K. and W. Mori, "Syntheses & Characterization of Microporous Coordination Polymers with Open Frameworks", J. Phys. Chem. B, 2002, 106, pp. 1380-1385.

Rosi, N.L., J. Eckert, M. Eddaoudi et al., "Hydrogen Storage in Microporous Metal-Organic Frameworks", Science, vol. 300, May 16, 2003, pp. 1127-1129.

Yaghi, O.M. M. O'Keeffe, N.W. Ockwig et al., "Reticular Synthesis and the Design of New Materials", Nature, vol. 423, Jun. 2003, pp. 705-714.

McGregor, Douglas S. et al., "Semi-Insulating Bulk GaAs Thermal Neutron Imaging Arrays," IEEE Transactions on Nuclear Science, vol. 43, No. 3, Jun. 1996, pp. 1357-1364.

Rose, A., "Sputtered Boron Films on Silicon Surface Barrier Detectors," Nuclear Instruments and Methods, 52, 1967, pp. 166-170.

Feigl, B. et al., "Der Gd-Neutronenzahler," Nuclear Instruments and Methods, 61, Wien, Austria, 1968, pp. 349-356.

Mireshghi, A. et al., "High Efficiency Neutron Sensitive Amorphous Silicon Pixel Detectors," IEEE Transactions on Nuclear Science, vol. 41, No. 4, Aug. 1994, pp. 915-921.

Foulon, F. et al., "Neutron Detectors Made From Chemically Vapour Deposited Semiconductors," Proc. MRS, 487, 1998, pp. 591-596.

Dulloo, A.R. et al., "Radiation Response Testing of Silicon Carbide Semiconductor Neutron Detectors For Monitoring Thermal Neutron Flux," Report 97-9TK1-NUSIC-R1, Westinghouse STC, Pittsburgh, PA, Nov. 18, 1997, pp. 6-1-6-14.

Knoll, Glenn F., Radiation Detection and Measurement, 3rd Ed. John Wiley & Sons, Inc., New York, 2000, Chapter 14, pp. 505-508.

Garber, D.I. et al., "Neutron Cross Sections," 3rd Edition, vol. 11, Curves, Brookhaven National Laboratory, Upton, Jan. 1976, pp. 11-13 & pp. 23-24.

McLane, Victoria et al., "Neutron Cross Sections," vol. 2, Neutron Cross Section Curves, Academic Press, San Diego, CA, 1988, pp. 12-13 & pp. 26-27.

McGregor, Douglas, S. et al., "Thin-Film-Coated Bulk GaAs Detectors for Thermal and Fast Neutron Measurements," Nuclear Instruments and Methods in Physics Research A 466, 2001, pp. 126-141.

McGregor, Douglas, S. et al., "Design Considerations for Thin Film Coated Semiconductor Thermal Neutron Detectors—I: Basics Regarding Alpha Particle Emitting Neutron Reactive Films," Nuclear Instruments & Methods, A 500, 2003, pp. 272-308.

Puckett, P.R. et al., "Thin Film Processes II," Chapter V-2, J.L. Vossen and W. Kern, Eds., Academic Press, Boston, 1991, pp. 749, 768-770.

Sze, S.M., "VLSI Technology," McGraw-Hill, New York, 1983.

Ruska, W.S., "Microelectronic Processing," McGraw-Hill, New York, 1987.

McGregor, Douglas, S. et al., "Self-Biased Boron-10 Coated High-Purity Epitaxial GaAs Thermal Neutron Detectors," IEEE Transactions on Nuclear Science, vol. 47, No. 4, Aug. 2000, pp. 1364-1370.

Klann, Raymond T. et al., "Development of Coated Gallium Arsenide Neutron Detectors," Conference Record of ICONE-8, 8th International Conf. on Nuclear Eng., Apr. 2-6, 2000, Baltimore, MD, pp. 1-6.

McGregor, Douglas, S. et al., "New Surface Morphology for Low Stress Thin-Film-Coated Thermal Neutron Detectors," IEE Transactions on Nuclear Science, vol. 49, No. 4, Aug. 2002, pp. 1999-2004.

http://www.mems-exchange.org/.

http://physics.nist.gov/MajResProj/rfcell/drawings.html.

Schelten, J. et al., "A New Neutron Detector Development Based on Silicon Semiconductor and LiF Converter," Physica B 234-236, 1997, pp. 1084-1086.

Atomnaya Energiya, Soviet Atomic energy, Russian Original, vol. 62, No. 4, Apr. 1987, pp. 316-319.

Allier, C.P., "Micromachined Si-Well Scintillator Pixel Detectors," Chapter 8, 2001, pp. 122-134.

McGregor, Douglas S. et al., "Bulk GaAs-Based Neutron Detectors For Spent Fuel Analysis," Proceedings of ICONE 8, 8th Int'l Conf. on Nuclear Eng., Baltimore, MD, Apr. 2-6, 2000, pp. 1-5.

De Lurgio, Patrick M. et al., "A Neutron Detector To Monitor The Intesity of Transmitted Neutrons For Small-Angle Neutron Scattering Instruments," Elsevier Science B.V., Nuclear Instruments And Methods in Physics Research A 505, 2003, pp. 46-49.

Klann, Raymond T. et al., "Development of Semiconductor Detectors For Fast Neutron Radiography," 15th Int'l. conf. on Applications of Accelerators in Research and Industry, Nov. 2000, pp. 1-4.

Gersch, H.K. et al., "The Effect of Incremental Gamma-Ray Doses and Incremental Neutron Fluences Upon The Performance of Self-Biased 10B-Coated High-Purity Epitaxial GaAs Thermal Neutron Detectors," Nuclear Instruments and Methods in Physics Research A 489, Feb. 12, 2002, pp. 85-98.

McGregor, Douglas S. et al., "Thin-Film-Coated Detectors For Neutron Detection," J. of Korean Assoc. For Radiation Protection, vol. 26, 2001, pp. 167-175.

McGregor, Douglas, S. et al., "Designs For Thin-Film-Coated Semiconductor Thermal Neutron Detectors," University of Michigan, Ann Arbor, Michigan, Nov. 14, 2001, pp. 1-6.

McGregor, Douglas S. et al., "Recent Results From Thin-Film-Coated Semiconductor Neutron Detectors," Proceedings of SPIE, vol. 4784, 2002, pp. 164-182.

Chae et al., "A route to high surface area, porosity and inclusion of large molecules in crystals," Nature, 2004, vol. 247, pp. 523-527.

Eddaoudi, M., J. Kim, J.B. Wachter et al., "Porous Metal-Organic Polyhedra: 25Å Cuboctahedron Constructed from 12 $Cu_2$ $(CO_2)_4$ Paddle-Wheel Building Blocks," J. Am. Chem. Soc., 2001, 123, pp. 4368-4369.

Biradha, K., Y. Hongo & M. Fujita, "Open Square-Grid Coordination Polymers of the Dimension 20×20 Å: Remarkably Stable & Crystalline Solids Even After Guest Removal," Angew. Chem. Int. Ed., 2000, 39, No. 21, pp. 3843-3845.

Li, Hailian, C.E. Davis, T.L. Groy, D.G. Kelley, O.M. Yaghi, "Coordinatively Unsaturated Metal Centers in the Extended Porous Framework of $Zn_3 \cdot (BDC)_3 6CH_3OH$ (BDC=1,4-Benzenedicarboxylate)," J. Am. Chem. Soc. 1998, 120, pp. 2186-2187.

Yaghi, O.M., G. Li, H. Li, "Selective binding and removal of guests in a microporous metal-organic framework," Nature, vol. 378(6558), Dec. 14, 1996, pp. 703-706.

Yaghi, O.M., C.E. Davis, G. Li, and H. Li, "Selective Guest Binding by Tailored Channels in a 3-D Porous Zinc(II)-Benzenetricarboxylate Network," J. Am. Chem. Soc. 1997, 199, pp. 2861-2868.

Yaghi, O.M., H. Li, "Hydrothermal Synthesis of a Metal-Organic Framework Containing Large Rectangular Channels," J. Am. Chem. Soc. 1995, 117, pp. 10401-10402.

Yaghi, O.M., H. Li, C. Davis, D. Richardson and T.L. Groy, "Synthetic Strategies, Structure Patterns, and Emerging Properties in the Chemistry of Modular Porous Solids," Acc. Chem. Res. 1998, 31, pp. 474-484.

Li, H., M. Eddaoudi, D.A. Richardson and O.M. Yaghi, Porous Germanates: Synthesis, Structure, and Inclusion Properties of $Ge_7O_{14.5}F_2 \cdot [(CH_3)_3NH_2]_2(H_2O)_{0.86}$, J. Am. Chem. Soc., 1998, 120, pp. 8567-8568.

Li, H., M. Eddaoudi, T.L. Groy and O.M. Yaghi, Establishing Microporosity in Open Metal—Organic Frameworks: Gas Sorption Isotherms for Zn(BDC) (BDC=1,4-Benzenedicarboxylate), J. Am Chem. Soc. 1998, 120, pp. 8571-8572.

Li, H. and O.M. Yaghi, "Transformation of Germanium Dioxide to Microporous Germanate 4-Connected Nets," J. Am Chem. Soc. 1998, 120, pp. 10569-10570.

Reineke, T.M., M. Eddaoudi, M. Fehr, D. Kelley and O.M. Yaghi, "From Condensed Lanthanide Coordination Solids to Microporous Frameworks Having Accessible Metal Sites," J. Am. Chem. Soc. 1999, 121, pp. 1651-1657.

Li, H., M. Eddaoudi and O.M. Yaghi, "An Open-Framework Germanate with Polycubane-Like Topology," Angew. Chem. Int. Ed. 1999, 38, No. 5, pp. 653-655.

Reineke, T.M., M. Eddaoudi, M. O'Keeffe and O.M. Yaghi, "A Microporous Lanthanide—Organic Framework," Angew. Chem. Int. Ed. 1999, 38, No. 17, pp. 2590-2594.

Chen, B., M. Eddaoudi, T.M. Reineke, J.W. Kampf, M. O'Keeffe and O.M. Yachi, $Cu_2(ATC) \cdot 6H_2O$: Design of Open Metal Sites in Porous Metal-Organic Crystals (ATC: 1,3,5,7-Adamantane Tetracarboxylate), J. Am. Chem. Soc. 2000, 122, pp. 11559-11560.

Chae, H.K., M. Eddaoudi, J. Kim, S.I. Hauck, J.F. Hartwig, M. O'Keeffe and O.M. Yaghi, "Tertiary Building Units: Synthesis, Structure, and Porosity of a Metal-Organic Dendrimer Framework (MODF-1)," J. Am. Chem. Soc. 2001, 123, pp. 11482-11483.

Braun, M.E., C.D. Steffek, J. Kim, P.G. Rasmussen and O.M. Yaghi, "1,4-Benzenedicarboxylate derivatives as links in the design of paddle-wheel units and metal-organic frameworks," Chem. Commun., 2001, pp. 2532-2533.

Barton, T.J., L.M. Bull, W.G. Klemperer, D.A. Loy, B. McEnaney, M. Misono, P.A. Monson, G. Pez, G.W. Scherer, J.C. Vartuli and O.M. Yaghi, "Tailored Porous Materials," Chem. Mater. 1999, 11, pp. 2633-2656.

Eddaoudi, M., J. Kim, M. O'Keeffe and O.M. Yaghi, "$Cu_2$ [o-Br-$C_6H_3(CO_2)_2]_2 (H_2O)_2 \cdot (DMF)_8 (H_2O)_2$: A Framework Deliberately Designed To Have the NbO Structure Type," J. Am. Chem. Soc., 2002, vol. 124, No. 3, pp. 376-377.

Rosi, N.L., M. Eddaoudi, J. Kim, M. O'Keeffe and O.M. Yaghi, "Advances in the chemistry of metal-organic frameworks," CrystEngComm, 2002, 4(68), pp. 401-404.

Plevert, J., R. Sanchez-Smith, T.M. Gentz, H. Li, T.L. Groy, O.M. Yaghi and M. O'Keeffe, "Synthesis and Characterization of Zirconogermanates," Inorganic Chemistry, vol. 42, No. 19, 2003, pp. 5954-5959.

Vodak, D.T., K. Kim, L. Iordanidis, P.G. Rasmussen, A.J. Matzger and O.M. Yaghi, "Computation of Aromatic $C_3N_4 N(C_3N)_3Cl_6$," Chem. Eur. J. 2003, 9, pp. 4197-4201.

Olaf Delgado Friedrichs, Michael O'Keeffe and Omar M. Yaghi, "Three-periodic nets and tilings: regular and quasiregular nets," Acat Cryst., 2003, A59, pp. 22-27.

Olaf Delgado Friedrichs, Michael O'Keeffe and Omar M. Yaghi, "Three-periodic nets and tilings: semiregular nets," Acat Cryst., 2003, A59, pp. 515-525.

Hailian Li, Jaheon Kim, Michael O'Keeffe and Omar M. Yaghi, "$[Cd_{16}In_{64}S_{134}]^{44-}$: 31-Å Tetrahedron with a Large Cavity," Angew. Chem. Int. Ed., 2003, 42, pp. 1819-1821.

Chae, H.K., J. Kim, O.D. Friedrichs, M. O'Keeffe and O.M. Yaghi, "Design of Frameworks with Mixed Triangular and Octahedral Building Blocks Exemplified by the Structure of $[Zn_4O (TCA)_2]$ Having the Pyrite Topology," Angew. Chem. Int. Ed, 2003, 42, pp. 3907-3909.

Plevert, J., T.M. Gentz, T.L. Groy, M. O'Keeffe and O.M. Yaghi, "Layered Structures Constructed from New Linkages of $Ge_7$ (O,OH,F)19 Clusters," Chem. Mater., 2003, 15, pp. 714-718.

Duren, T., L. Sarkisov, O.M. Yaghi and R.Q. Snurr, "Design of New Materials for Methane Storage," Langmuir, 2004, 20, pp. 2683-2689.

Rowsell, J.L.C., A.R. Millward, K.S. Park and O.M. Yaghi, "Hydrogen Sorption in Functionalized Metal-Organic Frameworks," J. Am. Chem. Soc., 2004, 126, pp. 5666-5667.

Rowsell, J.L.C., O.M. Yaghi, "Metal-organic frameworks: a new class of porous materials," Microporous and Mesoporous Materials 73 (2004), pp. 3-14.

Rosi, N.L., J. Kim, M. Eddaoudi, B. Chen, M. O'Keeffe and O.M. Yaghi, "Rod Packings and Metal-Organic Frameworks Constructed from Rod-Shaped Secondary Building Units," J. Am. Chem. Soc., 2005, 127, pp. 1504-1518.

Chen, B., N.W. Ockwig, F.R. Fronczek, D.S. Contreras and O.M. Yaghi, "Transformation of a Metal-Organic Framework from the NbO to PtS Net," Inorganic Chemistry, vol. 44, No. 2, 2005, pp. 181-183.

\* cited by examiner

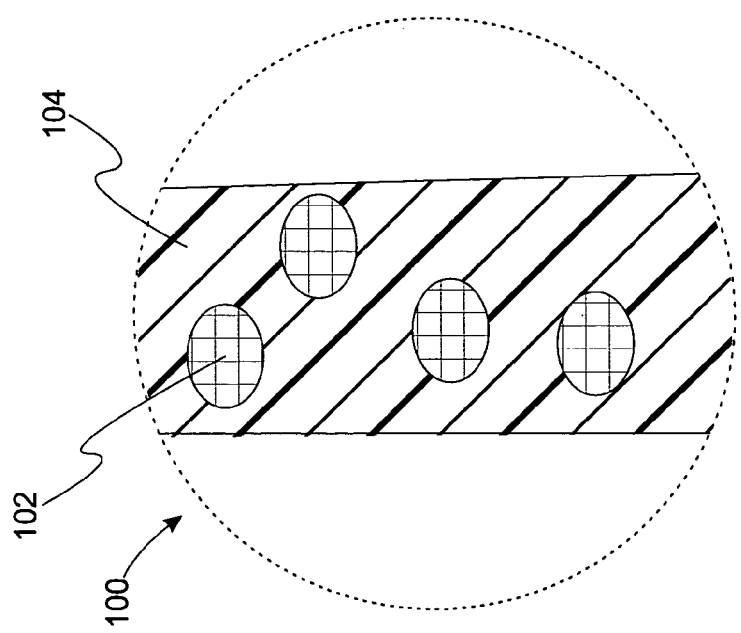
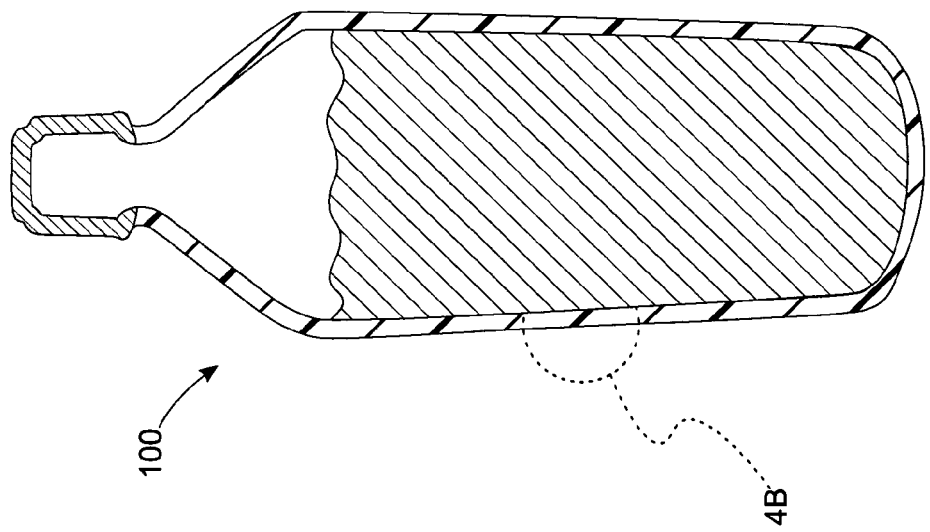

Table 1 Characteristics of selected MOFs.

| Compound | Link | Uptake (mmol/g) at 35 bar | No. $CO_2$ molecules per f.u. | Surface Area ($m^2/g$) |
|---|---|---|---|---|
| MOF-2 | | 3.2 | 1.5 | 345 |
| MOF-505 | | 10.2 | 4.6 | 1547 |
| MOF-74 | | 10.4 | 3.4 | 816 |
| $Cu_3(BTC)_2$ | | 10.7 | 6.5 | 1781 |
| IRMOF-11 | | 14.7 | 17.0 | 2096 |
| IRMOF-3 | | 18.7 | 15.2 | 2160 |
| IRMOF-6 | | 19.5 | 16.4 | 2516 |
| IRMOF-1 | | 21.7 | 16.7 | 2833 |
| MOF-177 | | 33.5 | 38.5 | 4508 |

Figure 5

METAL-ORGANIC FRAMEWORKS WITH EXCEPTIONALLY HIGH CAPACITY FOR STORAGE OF CARBON DIOXIDE AT ROOM-TEMPERATURE

CROSS-REFERENCE TO RELATED APPLICATIONS

This application claims the benefit of U.S. Provisional Application Ser. No. 60/720,439, filed Sep. 26, 2005, the entire disclosure of which is hereby incorporated by reference.

BACKGROUND OF THE INVENTION

1. Field of the Invention

The present invention relates generally to systems that are used to store gas molecules, and specifically to systems that store carbon dioxide by adsorption or absorption.

2. Background Art

Carbon dioxide has a greater impact on the environment than any other anthropogenic greenhouse gas due to the sheer amount that is being discharged into the atmosphere by combustion of fossil fuels. Carbon dioxide levels have increased by over 30% since the beginning of the industrial revolution, resulting in a global warming trend and increased acidity of oceans. Many countries have responded by ratifying the Kyoto Protocol in an effort to reduce emissions.

Mitigation technologies are necessary for the short- and long-term capture and storage of carbon dioxide. Removal of carbon dioxide from the flue exhaust of power plants, currently a major source of anthropogenic carbon dioxide, is commonly accomplished by chilling and pressurizing the exhaust or by passing the fumes through a fluidized bed of aqueous amine solution, both of which are costly and inefficient. Other methods based on chemisorption of carbon dioxide on oxide surfaces or adsorption within porous silicates, carbon, and membranes have been pursued as means for carbon dioxide uptake. Although each of the prior art technologies work to some extent. More cost effective technologies are necessary to cope with the overwhelming amount of carbon dioxide currently generated.

Accordingly, there is a need for material with high carbon dioxide storage capacity.

SUMMARY OF THE INVENTION

The present invention solves one or more problems of the prior art by providing in one embodiment a carbon dioxide storage system. The carbon dioxide storage system of this embodiment comprising a container, and a conduit attached to the container for introducing or removing a carbon dioxide-containing composition from the container. A carbon dioxide storage material is positioned within the container. The carbon dioxide-storage material includes a metal-organic framework ("MOF"), which has a sufficient surface area to store at least 10 carbon dioxide molecules per formula unit of the metal-organic framework at a temperature of about 25° C. Advantageously, the metal-organic framework has a periodic structure for which carbon dioxide uptake and release is fully reversible. Moreover, the metal-organic framework is thermally stable, and sufficiently flexible in that chemical functionalization and molecular level fine-tuning can be achieved for optimized uptake capacities.

BRIEF DESCRIPTION OF THE DRAWINGS

FIG. 4A is a schematic illustration of an embodiment of a carbon dioxide source formed into a beverage container;

FIG. 4B is a magnified schematic illustration of a section of the beverage container of FIG. 4A;

FIG. 5 is a Table providing carbon dioxide storage of several metal organic frameworks;

DETAILED DESCRIPTION OF THE PREFERRED EMBODIMENT(S)

Figure 1A:
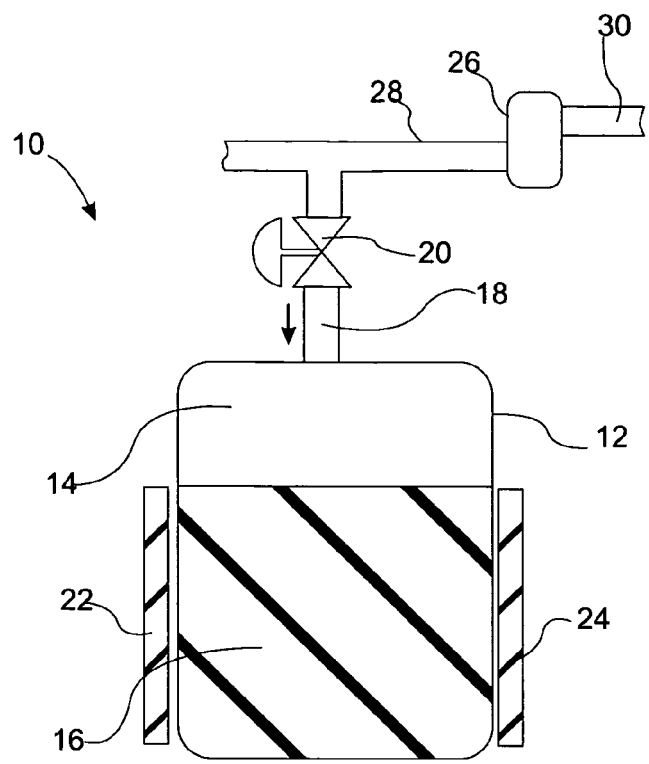
FIG. 1A is a schematic illustration of an embodiment of a carbon dioxide storage system using a single port for introducing and removing carbon dioxide.

Reference will now be made in detail to presently preferred compositions or embodiments and methods of the invention, which constitute the best modes of practicing the invention presently known to the inventors.

As used herein "linking ligand" means a chemical species (including neutral molecules and ions) that coordinate two or more metals resulting in an increase in their separation, and the definition of void regions or channels in the framework that is produced. Examples include 4,4'-bipyridine (a neutral, multiple N-donor molecule) and benzene-1,4-dicarboxylate (a polycarboxylate anion).

As used herein "non-linking ligand" means a chemical species that is coordinated to a metal but does not act as a linker.

As used herein "guest" means any chemical species that resides within the void regions of an open framework solid that is not considered integral to the framework. Examples include: molecules of the solvent that fill the void regions during the synthetic process, other molecules that are exchanged for the solvent such as during immersion (via diffusion) or after evacuation of the solvent molecules, such as gases in a sorption experiment.

As used herein "charge-balancing species" means a charged guest species that balances the charge of the framework. Quite often this species is strongly bound to the framework, i.e. via hydrogen bonds. It may decompose upon evacuation to leave a smaller charged species (see below), or be exchanged for an equivalently charged species, but typically it cannot be removed from the pore of a metal-organic framework without collapse.

As used herein "space-filling agent" means a guest species that fills the void regions of an open framework during synthesis. Materials that exhibit permanent porosity remain intact after removal of the space-filling agent via heating and/or evacuation. Examples include: solvent molecules or molecular charge-balancing species. The latter may decompose upon heating, such that their gaseous products are easily evacuated and a smaller charge-balancing species remain in the pore (i.e. protons). Sometimes space-filling agents are referred to as templating agents.

As used herein "accessible metal site" means a site in a metal cluster and, in particular, a position adjacent to a metal in a metal cluster available for a chemical moiety such as a ligand to attach.

As used herein "open metal site" means a site in a metal cluster and, in particular, a position adjacent to a metal in a metal cluster from which a ligand or other chemical moiety has been removed, rendering that metal cluster reactive for adsorption of a chemical species having available electron density for attachment to the metal cluster and, in particular, a metal in the metal cluster.

As used herein "metal cluster" means any metal containing moiety present in a metal-organic framework. This definition embracing single metal atoms or metal ions to groups of metals or metal ions that optionally include ligands or covalently bonded groups.

In an embodiment of the present invention, a carbon dioxide storage system is provided. With reference to FIG. 1A, a schematic illustration of the present embodiment is provided. Carbon dioxide storage system 10 includes container 12 which includes storage cavity 14. Carbon dioxide storage material 16 is positioned within container 12 filling at least a portion of carbon dioxide storage cavity 14. Carbon dioxide storage material 16 comprises a metal-organic framework that has a sufficient surface area to store at least 10 carbon dioxide molecules per formula unit of the metal-organic framework at a temperature of about 25° C. Carbon dioxide storage system 10 further includes inlet 18 through which carbon dioxide is introduced and optionally removed. Carbon dioxide storage system 10 may also include valve 20 for closing off container 12 as needed. In one variation, after carbon dioxide is introduced into container 12 and stored within the carbon dioxide storage material 16, valve 20 is closed off. Subsequently, when removal of the stored carbon dioxide is desired, the stored carbon dioxide is released by heating carbon dioxide storage material 16 via heaters 22, 24. In another variation, the stored carbon dioxide is removed under reduced pressure provided by pump 26 acting through conduit 28 and made available for subsequent use or processing via outlet 30.

Figure 1B:
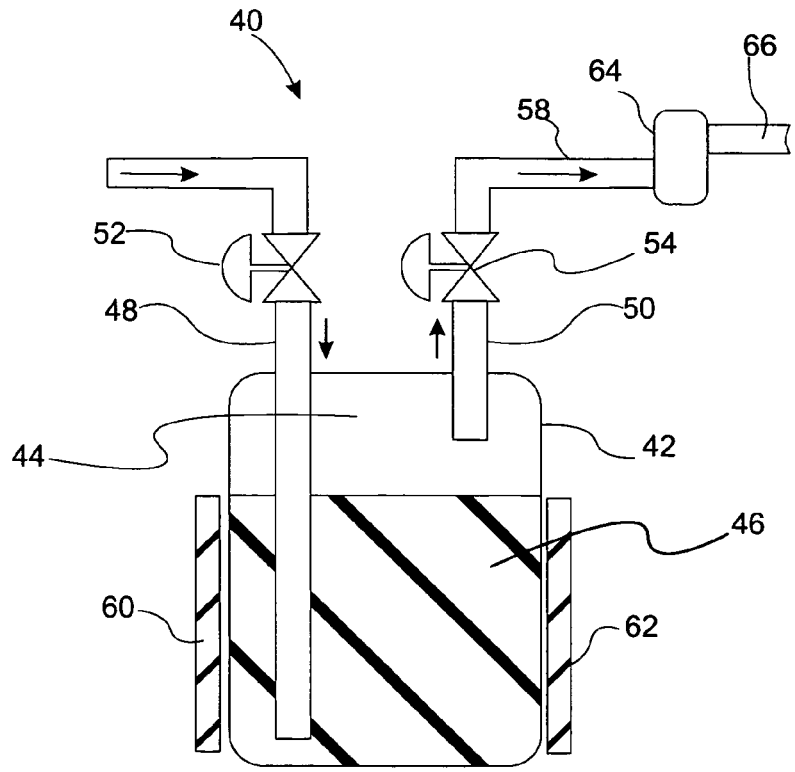
FIG. 1B is a schematic illustration of a variation of the carbon dioxide storage system having a separate outlet and inlet ports.

With reference to FIG. 1B, a schematic illustration of a variation of the carbon dioxide storage system having a separate outlet and inlet is provided. Carbon dioxide storage system 40 includes container 42 which includes storage cavity 44. Carbon dioxide storage material 46 is positioned within container 42 filling at least a portion of carbon dioxide storage cavity 44. Carbon dioxide storage material 46 comprises a metal-organic framework that has a sufficient surface area to store at least 10 carbon dioxide molecules per formula unit of the metal-organic framework at a temperature of about 25° C. Carbon dioxide storage system 40 further includes inlet 48 through which carbon dioxide is introduced and outlet 50 removed. Carbon dioxide storage system 40 may also include valves 52, 54 for closing off container 42 as needed. In one variation, after carbon dioxide is introduced into container 42 and stored within the carbon dioxide storage material 46, valves 52, 54 are closed off. Subsequently, when removal of the stored carbon dioxide is desired, the stored carbon dioxide is released by heating carbon dioxide storage material 46 via heaters 60, 62. In another variation, the stored carbon dioxide is removed under reduced pressure provided by pump 64 acting through conduit 58 and made available for subsequent use via outlet 66.

Figure 2:
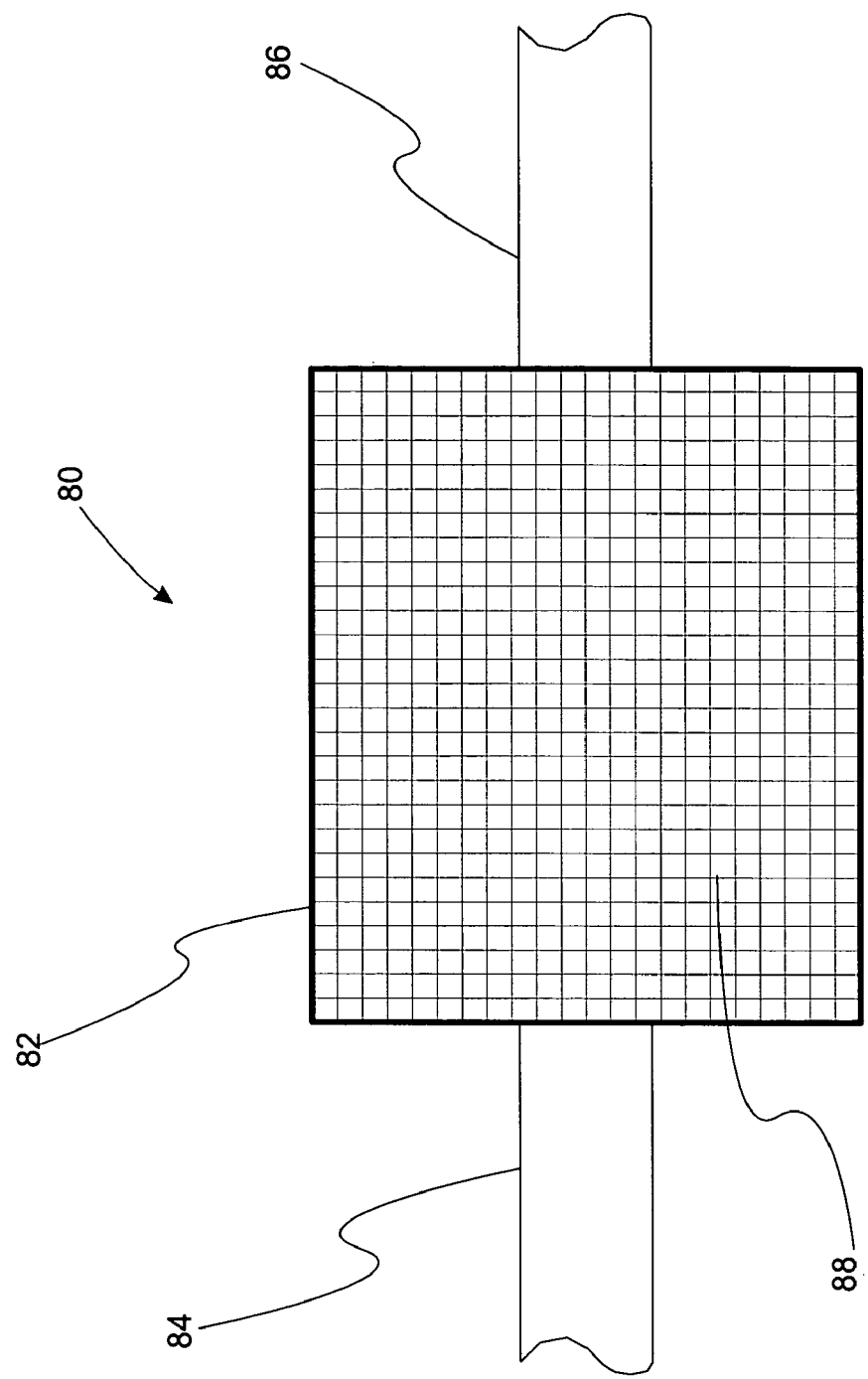
FIG. 2 is a schematic illustration of a variation of the carbon dioxide storage system adapted to be placed in the exhaust of a combustion source.

With reference to FIG. 2, a schematic illustration of a variation of the carbon dioxide storage system is provided. The variation depicted in FIG. 2 is particularly well suited for placement in the exhaust stream of a combustion source. Such combustion sources include, but are not limited to, automobile engine and power plants. Carbon dioxide storage system 80 includes container 82 having inlet 84 and outlet 86. Container 82 is at least partially filled with carbon dioxide storage material 88. As set forth above, storage material 88 comprises a metal-organic framework that has a sufficient surface area to store at least 10 carbon dioxide molecules per formula unit of the metal-organic framework at a temperature of about 25° C. Inlet 84 directs the exhaust from a combustion source into container 82. After contacting carbon storage material 88, the exhaust emerges out of container 82 through outlet 84. The contact of the exhaust with carbon storage material 88 results in at least a portion of the carbon dioxide in the exhaust being stored therein. Although the initial contact of the exhaust with carbon dioxide storage material 88 may be at elevated temperature, storage material 88 continues to store carbon dioxide even when cooled to a temperature of 0° C. to 40° C., and in particular, when cooled to room temperature (25° C.).

Figure 3A:
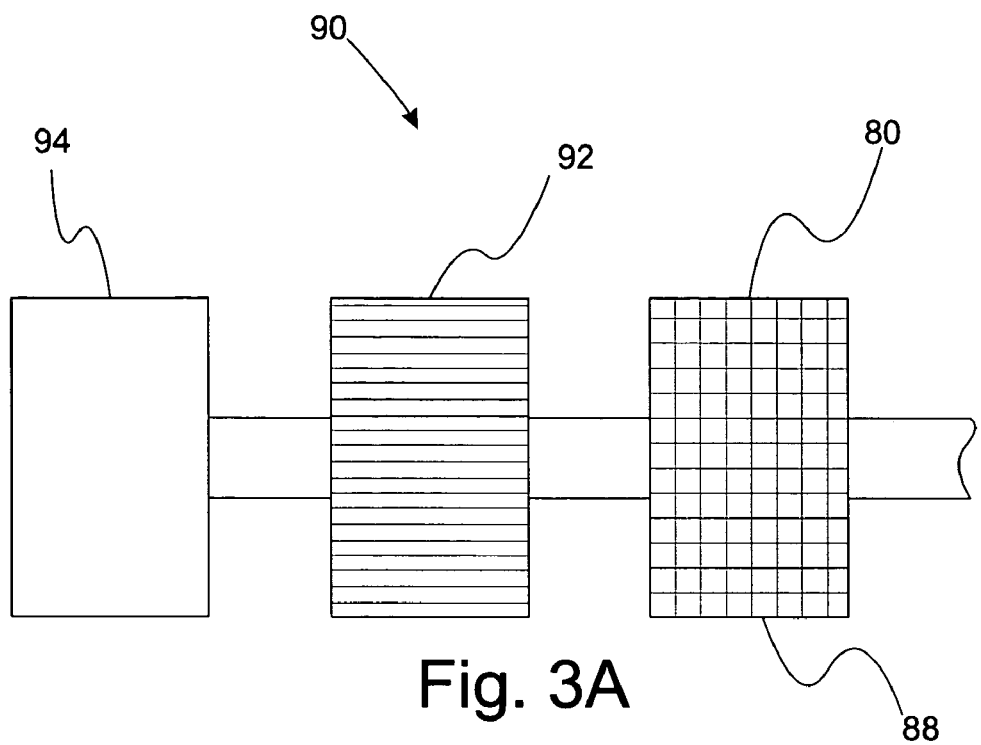
FIG. 3A is a schematic illustration of a first variation of an exhaust system incorporating the carbon dioxide storage system of FIG. 2.
Figure 3B:
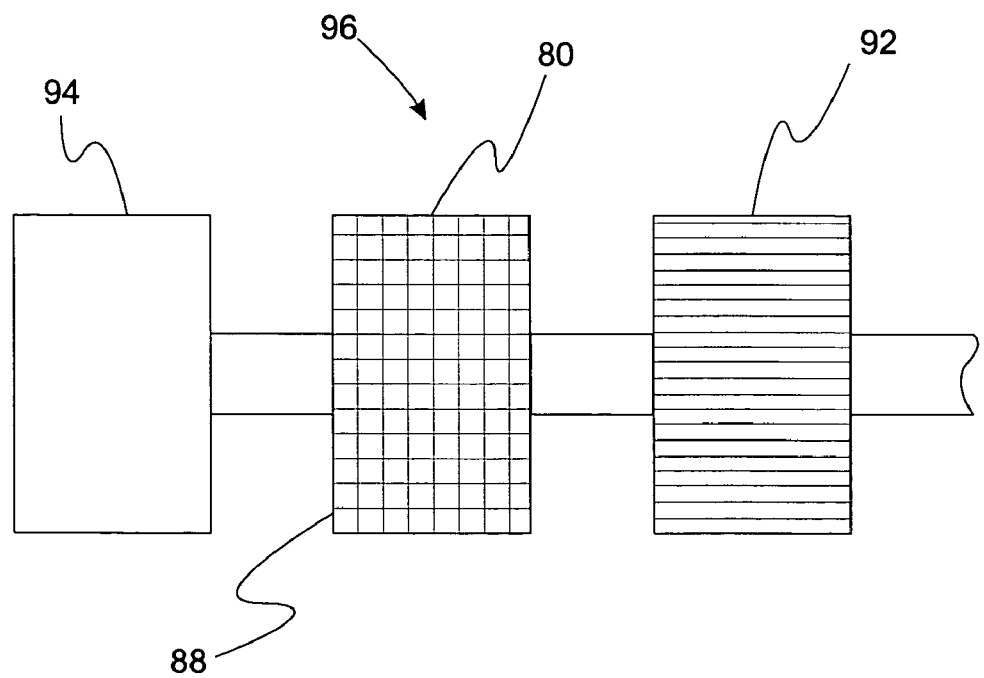
FIG. 3B is a schematic illustration of a second variation of an exhaust system incorporating the carbon dioxide storage system of FIG. 2.

With reference to FIGS. 3A and 3B, schematic illustrations showing the placement of the carbon dioxide storage system in an automobile exhaust are provided. FIG. 3A illustrates exhaust system 90 with carbon dioxide storage system 80 placed downstream of catalyst converter system 92. Exhaust gases containing carbon dioxide formed from internal combustion engine 94 are first passed through catalytic converter system 92 and then through carbon dioxide storage system 80. As set forth above, carbon dioxide is removed from the exhaust and stored in carbon dioxide storage material 88. FIG. 3B illustrates exhaust system 96 with carbon dioxide storage system 80 placed upstream of catalyst converter system 92. Exhaust gases containing carbon dioxide formed from internal combustion engine 94 are first passed through carbon dioxide storage system 80 and then through catalytic converter system 90. As set forth above, carbon dioxide is removed from the exhaust and stored in carbon dioxide storage material 88.

In another embodiment of the present invention, a carbon dioxide source is provided. With reference to FIGS. 4A and 4B, schematic illustrations of this embodiment are provided. Carbon dioxide source 100 includes support material 102 and carbon dioxide storage material 104 attached thereto. Storage material 104 comprises a metal-organic framework that having at least 10 carbon dioxide molecules per formula unit attached thereto. In one variation of the present embodiment, support material 104 is a resin. Suitable resins include, but are not limited to, thermoplastic polymer, thermoset polymers, and combinations thereof. The carbon dioxide source of this embodiment is advantageously used to add carbonation to liquids such as beverages. FIGS. 4A and 4B depict a beverage container at least partially formed from carbon dioxide storage source 100.

In each of the embodiments and variations of the present invention, the carbon dioxide storage material comprises a plurality of particles. The plurality of particles in turn include the metal-organic framework. In one refinement, the plurality of particles are characterized by having an average spatial dimension (i.e., each spatial dimension is in this range on average) from about 10 nanometers to 0.5 millimeter. In another variation, the plurality of particles are characterized by having an average spatial dimension from about 10 nanometers to 1000 nanometers. In another variation, the plurality of particles are characterized by having an average spatial dimension from about 10 nanometers to 500 nanometers. In another variation, the plurality of particles are characterized by having at least one spatial dimension with an average size less than 1000 nanometers. In another variation, the plurality of particles are characterized by having at least one spatial dimension with an average size less from 10 nanometers to 1000 nanometers. In still another variation, the plurality of particles are characterized by having at least one spatial dimension with an average size less than 200 nanometers.

The metal-organic framework of the present embodiment includes a plurality of metal clusters, and a plurality of charged multidentate linking ligands that connect adjacent metal clusters. Each metal cluster includes one or more metal ions. Advantageously, the metal-organic framework includes one or more sites for storing gas molecules. In variations of the present embodiment, the metal-organic frameworks used in the embodiments of the invention include a plurality of pores for gas adsorption. In one variation, the plurality of pores has a unimodal size distribution. In another variation, the plurality of pores have a multimodal (e.g., bimodal) size distribution.

In another variation of the invention, the metal organic frameworks include metal clusters comprising one or more metal ions. In another variation, the metal-organic frameworks include metal clusters that comprise two or more metal ions. In still another variation, the metal-organic frameworks include metal clusters that comprise three or more metal ions. The metal ion may be selected from the group consisting of Group 1 through 16 metals of the IUPAC Periodic Table of the Elements including actinides, and lanthanides, and combinations thereof. Examples of suitable metal ions include $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $OS^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, and combinations thereof. In a further refinement of this variation, the metal cluster has formula $M_mX_n$ where M is metal ion, X is selected from the group consisting of a Group 14 through Group 17 anion, m is an integer from 1 to 10, and n is a number selected to charge balance the metal cluster so that the metal cluster has a predetermined electric charge. In another refinement, X is selected from the group consisting of O, N, and S. In another refinement, M is selected from the group consisting of $Mg^{2+}$, $Ca^{2+}$, $Sr^{2+}$, $Ba^{2+}$, $V^{2+}$, $V^{3+}$, $V^{4+}$, $V^{5+}$, $M^{2+}$, $Re^{2+}$, $Fe^{2+}$, $Fe^{3+}$, $Ru^{3+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Zn^{2+}$, $Cd^{2+}$, $Hg^{2+}$, $Si^{2+}$, $Ge^{2+}$, $Sn^{2+}$, and $Pb^{2+}$.

In still another variation, the multidentate ligand has 6 or more atoms incorporated into aromatic rings. In other variations, the multidentate ligand has 12 or more atoms incorporated in aromatic rings. In yet another variation, the multidentate ligand has 16 or more atoms incorporated into aromatic rings. Examples of useful multidentate ligands include the ligands having formulae 1 through 20:

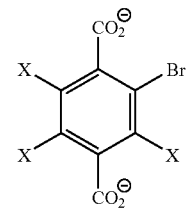

1

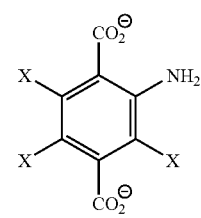

2

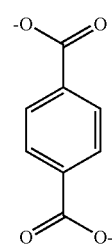

3

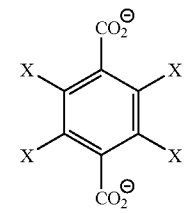

4

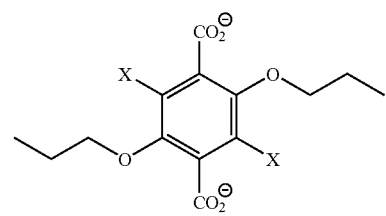

5

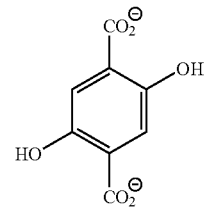

6

-continued
7
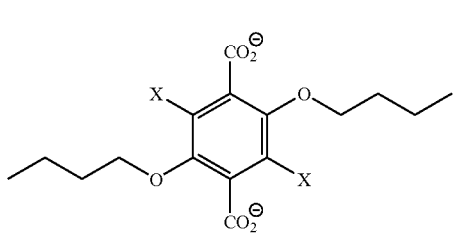
8
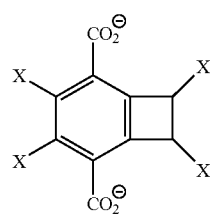
9
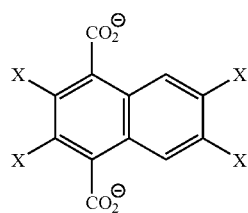
10
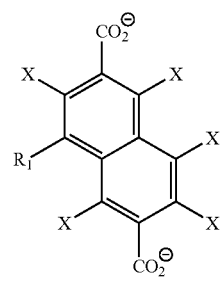
11
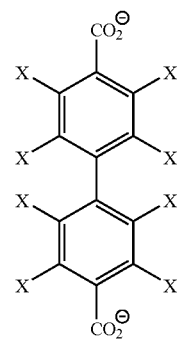
12
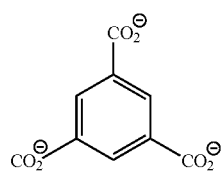
-continued
13
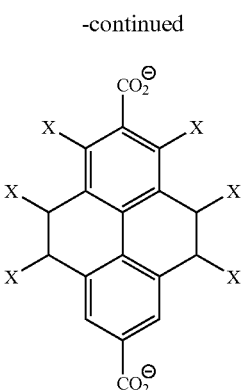
14
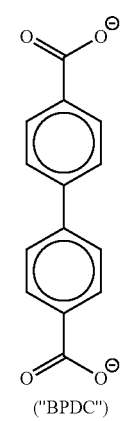
("BPDC")
15
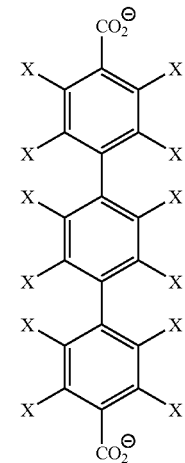
16
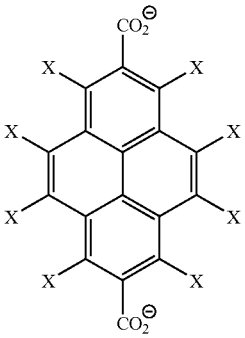

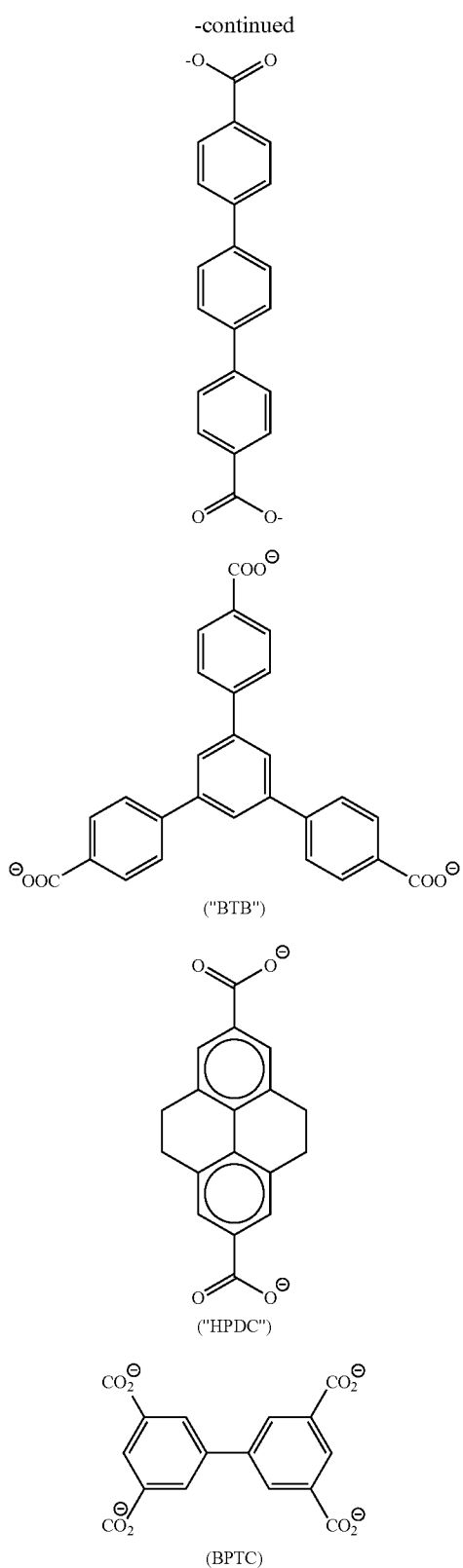

("BTB")

("HPDC")

(BPTC)

wherein X is hydrogen, —NHR, —N(R)$_2$, halides, C$_{1-10}$ alkyl, C$_{6-18}$ aryl, or C$_{6-18}$ aralky, —NH$_2$, alkenyl, alkynyl, —Oalkyl, —NH(aryl), cycloalkyl, cycloalkenyl, cycloalkynyl, —(CO)R, —(SO$_2$)R, —(CO$_2$)R —SH, —S(alkyl), —SO$_3$H, —SO$^{3-}$M$^+$, —COOH, —COO$^-$M$^+$, —PO$_3$H$_2$, —PO$_3$H$^-$M$^+$, —PO$_3^{2-}$M$^{2+}$, or —PO$_3^{2-}$M$^{2+}$, —NO$_2$, —CO$_2$H, silyl derivatives; borane derivatives; and ferrocenes and other metallocenes; M is a metal atom, and R is C$_{1-10}$ alkyl.

In a further refinement of the present invention, the charged multidentate linking ligands include a sufficient number of aromatic rings that the metal-organic framework has a surface area of at least 2000 m$^2$/g. In another refinement of the present invention, the charged multidentate linking ligands include a sufficient number of aromatic rings that the metal-organic framework has a surface area from about 2000 to 10000 m$^2$/g. In another refinement of the present invention, the charged multidentate linking ligands include a sufficient number of aromatic rings that the storage system is capable of storing at least 10 carbon dioxide molecules per formula unit of the metal-organic framework. In another refinement of the present invention, the charged multidentate linking ligands include a sufficient number of aromatic rings that the storage system is capable of storing at least 20 carbon dioxide molecules per formula unit of the metal-organic framework. In another refinement of the present invention, the charged multidentate linking ligands include a sufficient number of aromatic rings that the storage system is capable of storing at least 30 carbon dioxide molecules per formula unit of the metal-organic framework. In still another refinement of the present invention, the charged multidentate linking ligands include a sufficient number of aromatic rings that the storage system is capable of storing from 10 to 100 carbon dioxide molecules per formula unit of the metal-organic framework. In still another refinement of the present invention, the charged multidentate linking ligands include a sufficient number of aromatic rings that the storage system is capable of storing from 15 to 60 carbon dioxide molecules per formula unit of the metal-organic framework. In yet another refinement of the present invention, the charged multidentate linking ligands include a sufficient number of aromatic rings that the storage system is capable of storing from 20 to 50 carbon dioxide molecules per formula unit of the metal-organic framework.

The metal-organic framework used in the present invention optionally further comprises a non-linking ligand. In a variation, the non-linking ligand is selected from the group consisting of O$^{2-}$, sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, sulfide, hydrogen sulphate, selenide, selenate, hydrogen selenate, telluride, tellurate, hydrogen tellurate, nitride, phosphide, arsenide, arsenate, hydrogen arsenate, dihydrogen arsenate, antimonide, antimonate, hydrogen antimonate, dihydrogen antimonate, fluoride, boride, borate, hydrogen borate, perchlorate, chlorite, hypochlorite, perbromate, bromite, hypobromite, periodate, iodite, hypoiodite, and combinations thereof.

The metal-organic frameworks of the present invention optionally further comprise space-filling agents, adsorbed chemical species, guest species, and combinations thereof. In some variations of the invention, space-filling agents, adsorbed chemical species and guest species increase the surface area of the metal-organic framework. Suitable space-filling agents include, for example, a component selected from the group consisting of:

a. alkyl amines and their corresponding alkyl ammonium salts, containing linear, branched, or cyclic aliphatic groups, having from 1 to 20 carbon atoms;

b. aryl amines and their corresponding aryl ammonium salts having from 1 to 5 phenyl rings;

c. alkyl phosphonium salts, containing linear, branched, or cyclic aliphatic groups, having from 1 to 20 carbon atoms;

d. aryl phosphonium salts, having from 1 to 5 phenyl rings, e. alkyl organic acids and their corresponding salts, containing linear, branched, or cyclic aliphatic groups, having from 1 to 20 carbon atoms;

f. aryl organic acids and their corresponding salts, having from 1 to 5 phenyl rings;

g. aliphatic alcohols, containing linear, branched, or cyclic aliphatic groups, having from 1 to 20 carbon atoms;

h. aryl alcohols having from 1 to 5 phenyl rings;

i. inorganic anions from the group consisting of sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, $O^{2-}$, diphosphate, sulfide, hydrogen sulphate, selenide, selenate, hydrogen selenate, telluride, tellurate, hydrogen tellurate, nitride, phosphide, arsenide, arsenate, hydrogen arsenate, dihydrogen arsenate, antimonide, antimonate, hydrogen antimonate, dihydrogen antimonate, fluoride, boride, borate, hydrogen borate, perchlorate, chlorite, hypochlorite, perbromate, bromite, hypobromite, periodate, iodite, hypoiodite, and the corresponding acids and salts of said inorganic anions;

j. ammonia, carbon dioxide, methane, oxygen, argon, nitrogen, ethylene, hexane, benzene, toluene, xylene, chlorobenzene, nitrobenzene, naphthalene, thiophene, pyridine, acetone, 1,2-dichloroethane, methylenechloride, tetrahydrofuran, ethanolamine, triethylamine, trifluoromethylsulfonic acid, N,N-dimethyl formamide, N, N-diethyl formamide, dimethylsulfoxide, chloroform, bromoform, dibromomethane, iodoform, diiodomethane, halogenated organic solvents, N,N-dimethylacetamide, N,N-diethylacetamide, 1-methyl-2-pyrrolidinone, amide solvents, methylpyridine, dimethylpyridine, diethylethe, and mixtures thereof. Examples of adsorbed chemical species include ammonia, carbon dioxide, carbon monoxide, hydrogen, amines, methane, oxygen, argon, nitrogen, argon, organic dyes, polycyclic organic molecules, and combinations thereof. Finally, examples of guest species are organic molecules with a molecular weight less than 100 g/mol, organic molecules with a molecular weight less than 300 g/mol, organic molecules with a molecular weight less than 600 g/mol, organic molecules with a molecular weight greater than 600 g/mol, organic molecules containing at least one aromatic ring, polycyclic aromatic hydrocarbons, and metal complexes having formula $M_mX_n$ where M is metal ion, X is selected from the group consisting of a Group 14 through Group 17 anion, m is an integer from 1 to 10, and n is a number selected to charge balance the metal cluster so that the metal cluster has a predetermined electric charge, and combinations thereof. In some variations, adsorbed chemical species, guest species, and space-filling agents are introduced in the metal-organic frameworks by contacting the metal-organic frameworks with a pre-selected chemical species, guest species, or space-filling agent. In another variation of the present invention, the metal organic framework comprises an interpenetrating metal-organic framework that increases the surface area of the metal-organic framework.

FIG. 5 provides the carbon dioxide storage of several metal organic frameworks, some of which are potentially useful for inclusion in the carbon dioxide storage material used in the embodiments of the present invention. The list represents a cross-section of framework characteristics such as square channels (MOF-2), pores decorated with open metal sites (MOF-505 and $Cu_3(BTC)_2$), hexagonally packed cylindrical channels (MOF-74), interpenetration (IRMOF-11), amino- and alkyl-functionalized pores (IRMOF-3 and -6), and the ultra-high porosity frameworks IRMOF-1 and MOF-177. It should be appreciated that (MOF-177) has the highest carbon dioxide capacity of any porous material (33.5 mmol/g, 320 $cm^3(STP)/cm^3$, 147 wt %) at safe pressure (35 bar) and room temperature.

In still another embodiment of the present invention, a method of forming the carbon dioxide storage material set forth above is provided. The metal-organic framework is formed by combining a solution comprising a solvent, and metal ions selected from the group consisting of Group 1 through 16 metals including actinides, and lanthanides, and combinations thereof with a multidentate linking ligand to form a precursor MOF. Suitable metal ions and multidentate ligands are described above.

Examples of useful metal-organic frameworks in the practice of the embodiment, variations, and refinements of the present invention, include, but are not limited to, the metal-organic frameworks disclosed in U.S. Pat. Nos. 5,648,508; 6,617,467; 6,624,318; 6,893,564; 6,929,679; 6,930,193; and 7,008,607; in U.S. Patent Publication Nos. 20030078311; 20040225134; 20040249189; 20040265670; 20050004404; 20050154222; 20050192175; and 20060057057; and in patent application Ser. No. 11/400,478 filed Apr. 7, 2006. The disclosures of each of these patents and patent applications are hereby incorporated by reference in their entireties. In one variation, the metal-organic frameworks in these patents and patent applications are useful as precursor metal-organic frameworks by having a ligand or other chemical moiety that can be removed from a metal cluster thereby rendering that metal cluster reactive for adsorption of a chemical species. Moreover, such ligands include species such as water, solvent molecules contained within the metal clusters, and other chemical moieties having electron density available for attachment to the metal cluster and/or metal atoms or ions contained therein. Optionally, the solution also includes one or more counterions. Suitable counterions include, for example, sulfate, nitrate, halogen, phosphate, ammonium, and mixtures thereof. In a variation of the present invention, one or more ligands are removed from the precursor MOF to expose one or more open metal sites.

In one variation of the present embodiment, the one or more ligands are removed by heating the precursor MOF. Typically, in this variation, the precursor MOF is heated to a temperature from about 30° C. to about 300° C. In another variation, the one or more ligands are removed by exposing the precursor MOF to a vacuum. Typically, the vacuum is characterized by having a pressure less than $10^{-3}$ torr. In other variations, from about $10^{-5}$ torr to about 700 torr. In still another variation of the invention, the one or more ligands are removed by simultaneously heating the precursor MOF and by exposing the precursor MOF to a vacuum. In still another variation, the solution used in the method of the present invention may also include space-filling agents. Examples of suitable space-filling agents are set forth above. In a refinement of each of these variations, one or more ligands of the precursor MOF may be exchanged with another ligand or ligands that are more easily removed by subsequent heating and/or exposure to a vacuum.

Additional features of the storage of carbon dioxide in accordance with the present invention are found in J. Am. Chem. Soc., 127(51), 17998-17999, 2005 (JACSAt 10.1021/ja0570032 S0002-7863(05)07003-4 Web Release Date: Dec. 1, 2005). The entire disclosure of this publication is hereby incorporated by reference.

The following examples illustrate the various embodiments of the present invention. Those skilled in the art will recognize many variations that are within the spirit of the present invention and scope of the claims.

1. Synthesis and Activation of Materials.

The activated porous materials are handled under a blanket of nitrogen or methane gas. MOF-2: Anhydrous $ZnCl_2$ (3.0 g) and p-benzenedicaboxylic acid ($H_2BDC$) (2.15 g) are dissolved by vigorous stirring into dimethylformamide (DMF) (250 mL). A solution of distilled water (100 mL) and 40 wt % aqueous methylamine (3.6 mL) is added drop-wise over 15 minutes to partially titrate the clear, stirring DMF solution. After 1 day of sitting at room temperature the clear block crystals are filtered and washed with DMF. The filtered crystals are evacuated to $10^{-3}$ torr and heated to 60° C. in 30 minutes, then to 150° C. in 2 hours, and held at that temperature for 6 hours to give a 345 m$^2$/g sample. Norit RB2: The carbon sample is evacuated and heated at 300° C. for 5 hours to give a 1,184 m$^2$/g sample. MOF-505: Prepared and activated according to published procedure to give a 1,547 m$^2$/g sample. (Chen, B. L., Ockwig, N. W., Millward, A. R., Contreras, D. S. & Yaghi, O. M. *High H$_2$ adsorption in a microporous metal-organic framework with open-metal sites*. Angew. Chem. Int. Edit. 44, 4745-4749 (2005)). MOF-74: Zn(NO$_3$)$_2$.4H$_2$O (0.250 g) and 2,5-dihydroxybenzenedicarboxylic acid (H$_2$DHBDC) (0.100 g) are dissolved in a 20 mL vial containing DMF (10 mL), 1-propanol (0.5 mL) and distilled H$_2$O (0.5 mL), capped, and heated at 100° C. for 20 hours. The crystals are washed with DMF, then covered in 300 mL methanol and the methanol refreshed twice more in two days (a process referred to as "exchanging" with methanol). The crystals are evacuated to $10^{-3}$ torr and heated to 270° C. for 16 hours to produce an 816 m$^2$/g sample. Cu$_3$(BTC)$_2$: Cu(NO$_3$)$_2$.2.5H$_2$O (10.0 g) and 1,3,5-benzenetricarboxylic acid (H$_3$BTC) (5.0 g) are stirred for 10 minutes in 250 mL of solvent consisting of DMF, ethanol and water (1:1:1) in a 1 L jar to form a slurry. The tightly capped vessel is heated at 85° C. for 20 hours. The blue crystals are washed with DMF and exchanged with dichloromethane (CH$_2$Cl$_2$) thrice in three days. The dark blue crystals are then filtered and evacuated at 170° C. for 24 hours to give a 1,781 m$^2$/g sample. IRMOF-11: Zn(NO$_3$)$_2$.4H$_2$O (3.00 g) and hydropyrenedicarboxylic acid (H$_2$HPDC) (0.50 g) are dissolved in DEF (100 mL) in a 1 L jar, capped tightly, and heated to 100° C. for 20 hours. The solution is decanted and the brown block crystals are rinsed with DMF and exchanged with chloroform (CHCl3) thrice in three days. The material is evacuated at 125° C. for 6 hours to give a 2,096 m$^2$/g sample. IRMOF-3: Zn(NO$_3$)$_2$.4H$_2$O (6.945 g) and 2-aminobenzenedicarboxylic acid (H$_2$NH$_2$BDC) (0.966 g) are dissolved in a 1 L jar containing DEF (300 mL). The solution is degassed via bubbling N$_2$ for 10 minutes, then tightly capped and heated to 85° C. for 4 days. The solution is decanted, then the brown block crystals are washed in DMF and exchanged with CHCl$_3$ thrice in three days. The material is evacuated at 125° C. for 6 h to give a 2,160 m$^2$/g sample. IRMOF-6: Zn(NO$_3$)$_2$.4H$_2$O (9.00 g) and cyclobutylbenzenedicarboxylic acid (H$_2$C$_2$H$_4$BDC) (2.50 g) are dissolved in DEF (300 mL) and then filtered into a 1 L jar which is capped tightly and heated to 100° C. for 20 hours. The solution is decanted, and the light yellow block crystals are washed in DMF and exchanged with CHCl$_3$ thrice in three days. The material is evacuated at 125° C. for 6 hours to give a 2,516 m$^2$/g sample. IRMOF-1: Zn(NO$_3$)$_2$.4H$_2$O (0.832 g) and H$_2$BDC (0.176 g) are dissolved in DEF (10 mL) in a 20 mL vial, capped tightly, and heated to 100° C. for 20 hours. The solution is decanted, and the clear block crystals are washed in DMF and exchanged with CHCl3 thrice in three days. The material is evacuated at 125° C. for 6 hours to give a 2,833 m$^2$/g sample. MOF-177: Zn(NO$_3$)$_2$.6H$_2$O (0.368 g) and 4,4', 4"-benzene-1,3,5-triyl-tribenzoic acid (H$_3$BTB) (0.180 g) are dissolved in DEF (10 mL) in a 20 mL vial, capped tightly, and heated to 100° C. for 20 hours. The solution is decanted, and the clear block crystals are washed in DMF and exchanged with CHCl3 thrice in three days. The material is evacuated at 125° C. for 6 hours to give a 4,508 m$^2$/g sample. The MOF-177 crystallographic backbone density of 1.22 g/cm$^3$ is used to obtain its volumetric capacity. The backbone density is determined from the quotient of the guest-free unit cell formula weight (9180.45 g/mol) and the framework (backbone) volume. The framework volume is calculated as the difference between the unit cell volume and the "accessible" pore volume from Cerius2® (Accelrys Software, Inc.).

2. Properties of MOFs

Pure samples of these materials are synthesized in accordance to the methods set forth above. These materials are then characterized by powder x-ray diffraction and thermal gravimetric analysis and then carefully activated to obtain surface area by N$_2$ adsorption, and then handled under inert atmosphere to minimize atmospheric exposure. An activated carbon sample (Norit RB2) is also tested as a reference material. The gravimetric uptake capacity of carbon dioxide for each MOF is determined by exposing an evacuated sample of the MOF adsorbent to increasing pressure increments of carbon dioxide gas at ambient temperature. The sample and gas are allowed to come to equilibrium for each of the increments at which point the corresponding weight change is recorded, corrected for buoyancy, and plotted versus pressure.

Figure 6:
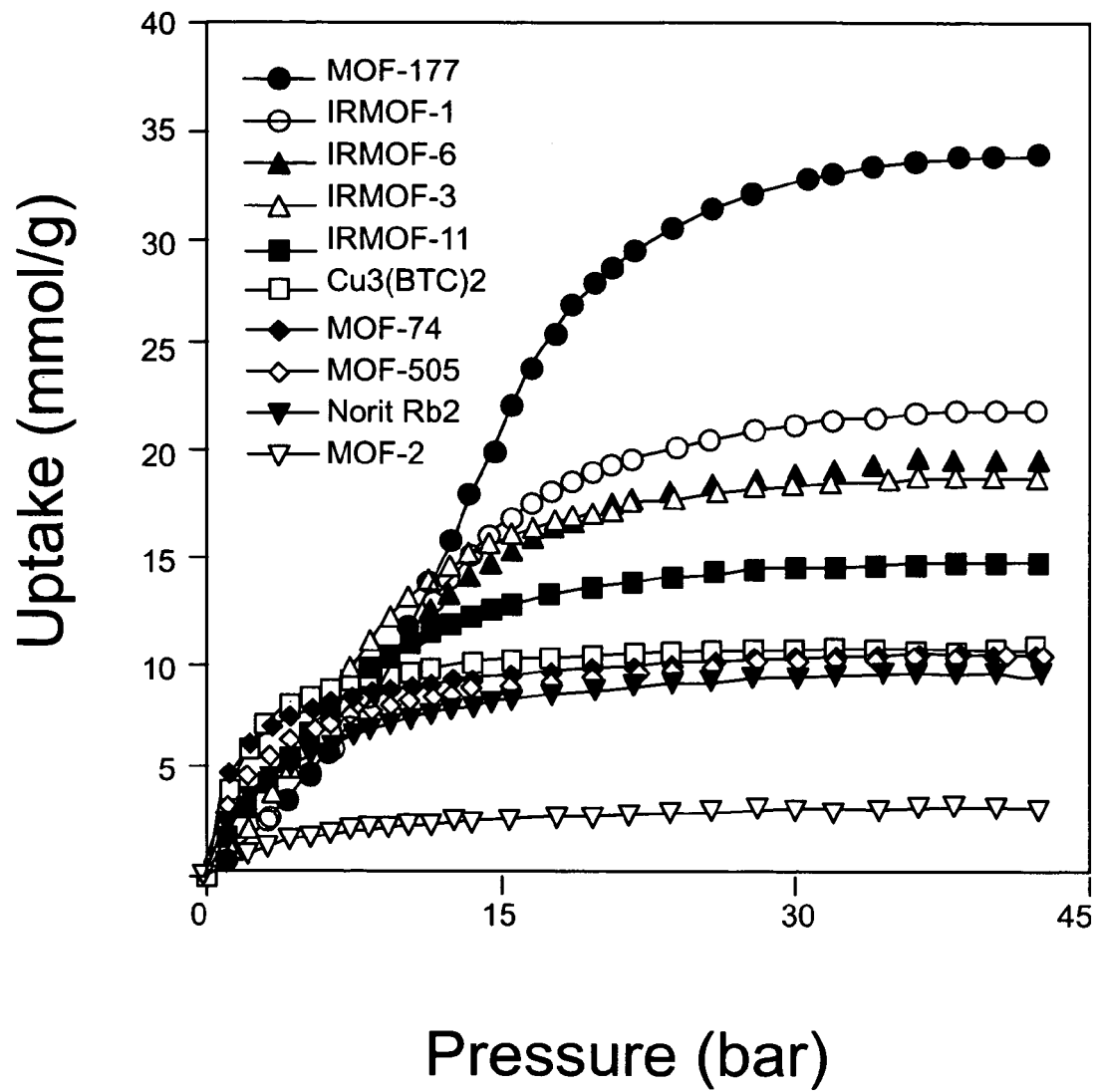
FIG. 6 provides carbon dioxide adsorption isotherms. Gravimetric carbon dioxide capacities for several MOFs (and an activated carbon) determined at ambient temperature, and pressures up to 42 bar. Maximum uptakes roughly scale with increasing surface area leading to a capacity of 33.5 mmol/g for MOF-177, the highest carbon dioxide capacity of any porous material.
Figure 7:
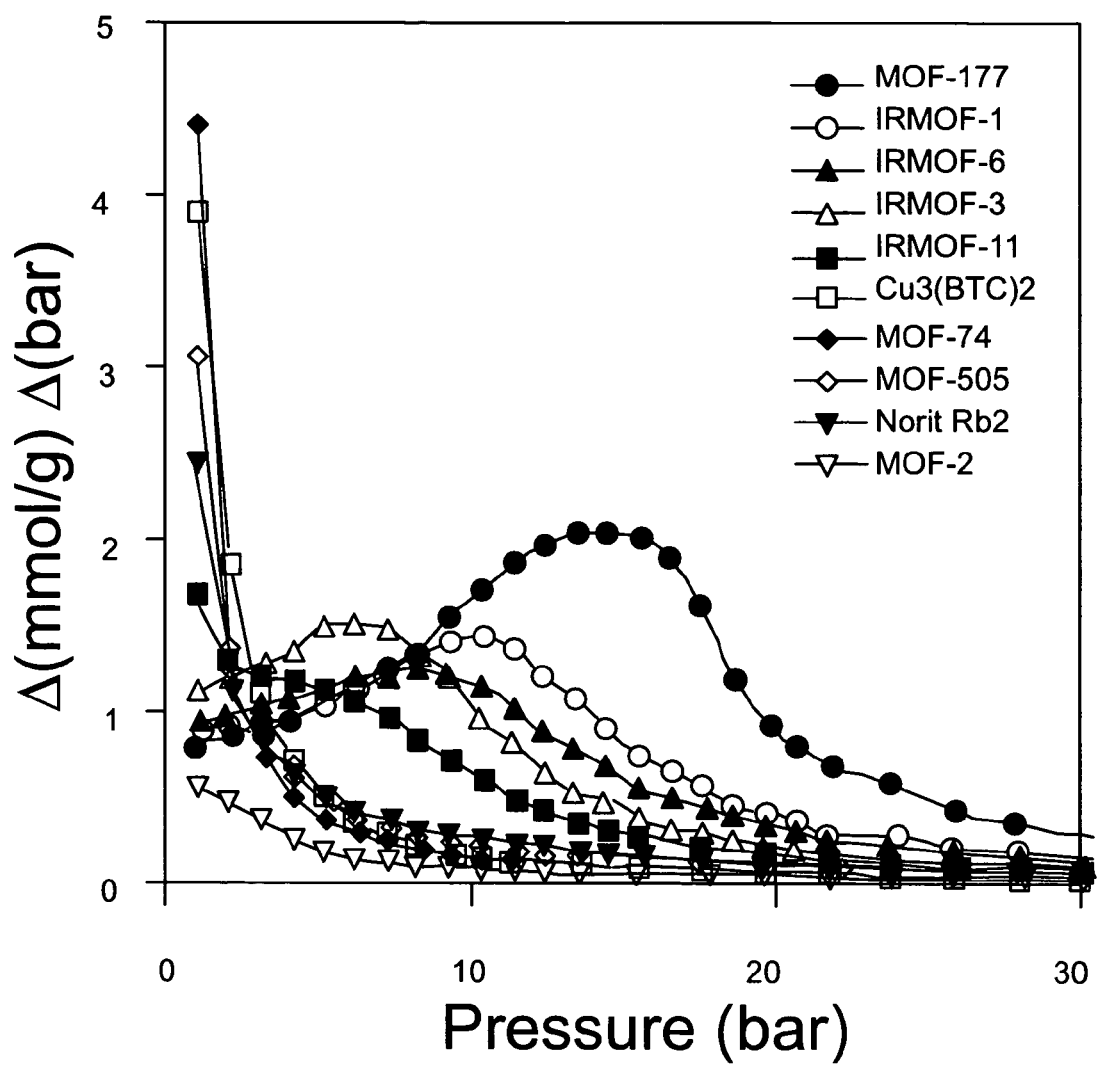
FIG. 7 provides relative isotherm step pressures. Approximations of the derivatives of the carbon dioxide isotherms. The maxima represent the pressures on which the isotherm steps are centred, and illustrate a correlation between step pressure and pore size.

The room-temperature carbon dioxide adsorption isotherms are shown in FIG. 6. MOF-2 has a typical monotonic isotherm (type I) in which the more intense gas adsorption at low pressure forms a "knee" in the isotherm. We found this same shape for the low-temperature (195 K) MOF-2 isotherm when carbon dioxide sorption is first reported in MOFs. Similarly, in the room temperature isotherm the pores begin to saturate at higher pressure where the uptake reaches a plateau resulting in a capacity of 3.2 mmol carbon dioxide per g MOF-2. Likewise, MOF-505, MOF-74 and Cu$_3$(BTC)$_2$ have this same isotherm shape, but the capacities of these materials at the same initial pressures are much greater owing to larger micropore volumes. Their saturation capacities are respectively 10.3, 10.4 and 10.7 mmol/g. The Norit activated carbon sample has a capacity of 9.5 mmol/g, which is consistent with other carbons of similar surface area. On the other hand, IRMOF-11, -3, -6 and -1 show substantially greater capacities for carbon dioxide than the previous MOFs, having corresponding uptakes of 14.7, 18.7, 19.5 and 21.8 mmol/g. Significantly, the shapes of these four isotherms gradually take on a sigmoidal curve (referred to as a step) with increasing capacity. The appearance of the step in this pressure regime is brought about by larger pore sizes, which allow the behaviour of the gas to more closely imitate the phase diagram of the bulk fluid. The voluminous space enclosed by MOF-177 enables it to adsorb carbon dioxide to 33.5 mmol/g, a capacity far greater than any other porous material.

The various saturation capacities observed for these MOFs can be related to the size and shape of the pores in each material. Two of the materials have one-dimensional (1-D) channels while the rest of the MOFs have three-dimensional (3-D) pore systems with larger volumes. MOF-2 is composed of layered square grids that form slanted channels of 5 Å diameter. These 1-D channels have one-third the capacity of the 13 Å hexagonal channels found in MOF-74. Although MOF-505 and Cu$_3$(BTC)$_2$ have smaller pore sizes (8 and 10 Å, and 6 and 15 Å) than MOF-74, the 3-D nature of their pore systems renders them more open which boosts their capacities to the same level as MOF-74. The isoreticular series of MOFs ("IRMOF") is based on the cubic framework of IRMOF-1. The pendant groups on the phenyl rings of IRMOF-3 and -6 reduce the available pore volume and thus lower their carbon dioxide adsorption capacity below that of IRMOF-1. The framework of IRMOF-11 contains a longer and wider link than IRMOF-1, which can increase pore volume. Yet the larger pore size results in interpenetration, thereby reducing the capacity of IRMOF-11 below those of IRMOF-3 and -6. The structure of MOF-177 is based on large trigonal links and a network that does not interpenetrate. It, therefore, envelops an immense amount of space within its structure, resulting in a carbon dioxide capacity far greater than the IRMOFs. This analysis illustrates a close correspondence between surface area and carbon dioxide capacity.

The fact that MOF-177 takes up more carbon dioxide at 35 bar does not preclude the use of other MOFs for carbon dioxide storage at lower pressures. This is revealed by an approximation of the derivatives of the isotherms with respect to pressure (FIG. 6). The maxima in these isotherms indicate the inflection points of the original isotherm steps, and are related to the pore sizes of the respective MOFs. There is a clear progression from the higher-pressure step of MOF-177 (stemming from the 11×17 Å pores) to IRMOF-1 (14 and 16 Å pores), through the sterically smaller pores of the functionalized IRMOF-3 and -6, down to the interpenetrated pores of IRMOF-11. The remaining MOFs have smaller pores and geometries such that their maxima do not appear on this pressure scale. This range of inflection points allows for the tailoring of MOFs to have maximal capacities at intermediate pressures.

IRMOF-3 and -6 allow accentuation of the effects of the amino and cyclobutyl pore functionalities. Given their isoreticular frameworks and similar pore shapes and sizes, one might expect them to have concurrent isotherm steps and similar overall capacities. Although the latter is true, the isotherm steps occur at strikingly different pressures (FIG. 6). Sterically, the —$NH_2$ group and ortho —H on the phenyl rings of IRMOF-3 occupy less space in the pore than the —$C_2H_4$ moiety of IRMOF-6. The pore diameter of IRMOF-6 should be just slightly smaller than IRMOF-3, which is contrary to the relative locations of their isotherm steps. Thus steric forces alone cannot account for the difference in isotherm step pressures. It is then evident that the amino group is not innocent in its physisorptive influence on carbon dioxide. That is, carbon dioxide may be binding more strongly to the lone electron pair on the nitrogen, reminiscent of the chemisorptive alkylamine solutions commonly used in acid gas removal.

Silica- and carbon-based physisorptive materials such as zeolites and activated carbons are often referenced as benchmark materials. Zeolites have enjoyed high utility in industrial applications based on their well-defined pore shapes and narrow pore size distributions, but the highest reported gravimetric carbon dioxide capacity for these materials at ambient temperature is 7.4 mmol/g (at 32 bar) for zeolite 13X. On the other hand, several carbons have been reported to have quite high capacities despite their amorphous nature, with a sample of MAXSORB showing an uptake of 25 mmol/g (at 35 bar). The 33.7 mmol/g gravimetric carbon dioxide capacity of MOF-177 at ambient temperature far exceeds these standard materials.

Figure 8:
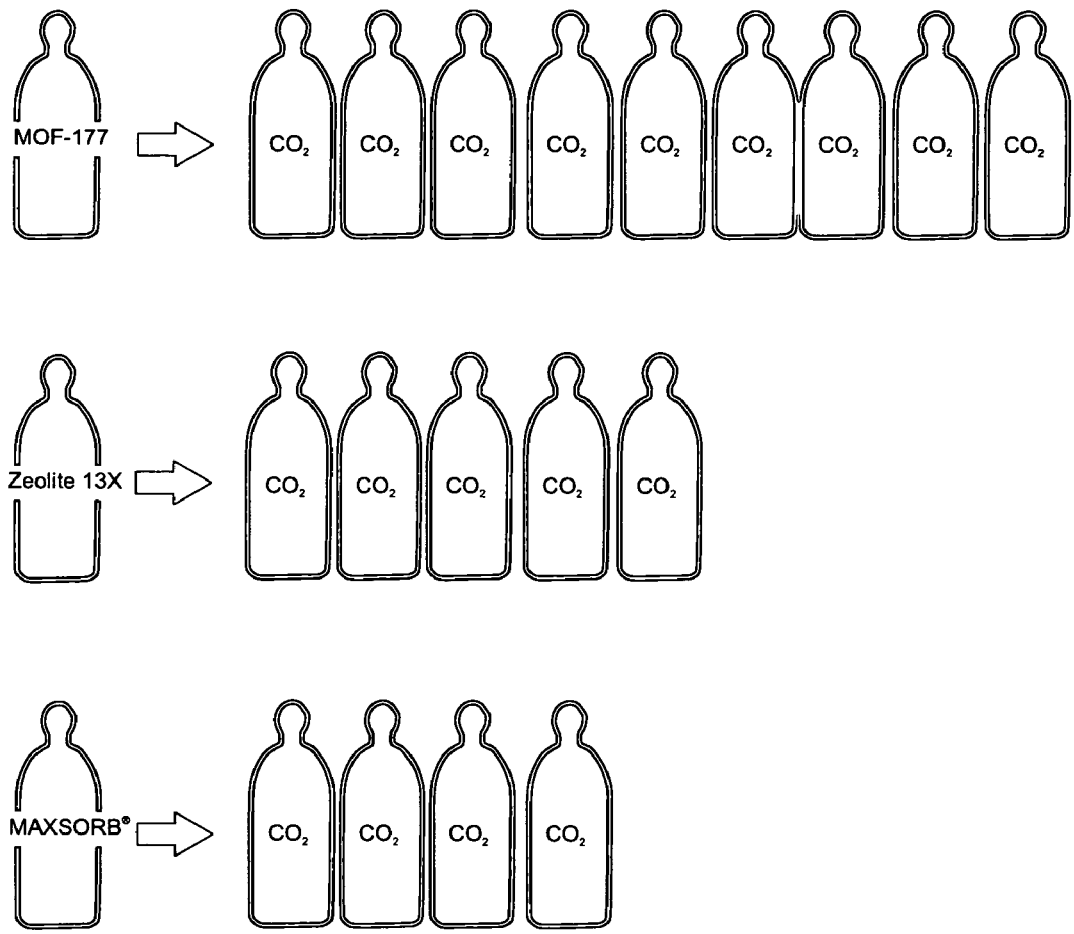
FIG. 8 provides comparison of carbon dioxide capacities. The volumetric carbon dioxide capacity of MOF-177 relative to zeolite 13X and MAXSORB® carbon. A canister of crystalline MOF-177 pressurized with 32 bar of carbon dioxide could hold the capacity of nine equivalent canisters containing only carbon dioxide at the same pressure and ambient temperature.

On a volumetric basis, FIG. 8 provides a comparison of a 1-liter canister filled with MOF-177 to one filled with zeolite 13X and another filled with MAXSORB Pressurizing these with 32 bar carbon dioxide would reveal that the vessel filled with MOF-177 can store nearly twice the amount of carbon dioxide as stored in either the zeolite- or carbon-filled vessels, and nearly nine times the amount stored in a canister containing only 32 bar carbon dioxide.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A carbon dioxide storage system comprising:
    a container;
    an inlet attached to the container, the inlet being adapted to direct a carbon dioxide-containing composition into the container; and
    a carbon dioxide storage material positioned within the container, the carbon dioxide storage material comprising a metal-organic framework, the metal-organic framework having sufficient surface area to store at least 10 carbon dioxide molecules per formula unit of the metal-organic framework at a temperature of about 25° C., the metal-organic framework comprising at least one open metal site, an open metal site being a position adjacent to a metal in a metal cluster from which a ligand or other chemical moiety has been removed, rendering that metal cluster reactive for adsorption of a chemical species having available electron density for attachment to the metal cluster.

2. The carbon dioxide storage system of claim 1 wherein the carbon dioxide storage material comprises a plurality of particles, the plurality of particles including the metal-organic framework.

3. The carbon dioxide storage system of claim 2 wherein the plurality of particles are characterized by having an average spatial dimension from about 10 nanometers to 0.5 millimeter.

4. The carbon dioxide storage system of claim 1 wherein the metal-organic framework comprises:
    a plurality of metal clusters, each metal cluster comprising one or more metal ions; and
    a plurality of charged multidentate linking ligands that connect adjacent metal clusters, wherein the metal-organic framework includes one or more sites for storing carbon dioxide by attachment of the carbon dioxide to the one or more sites.

5. The carbon dioxide storage system of claim 1 further comprising an outlet for removing the stored carbon dioxide.

6. The carbon dioxide storage system of claim 1 further comprising a heater and/or a vacuum pump for removing carbon dioxide from the carbon dioxide storage system.

7. The carbon dioxide storage system of claim 4 wherein the charged multidentate linking ligands include a sufficient number of aromatic rings that the storage system is capable of storing at least 20 carbon dioxide molecules per formula unit of the metal-organic framework.

8. The carbon dioxide storage system of claim 4 wherein the charged multidentate linking ligands include a sufficient number of aromatic rings that the storage system is capable of storing at least 30 carbon dioxide molecules per formula unit of the metal-organic framework.

9. The carbon dioxide storage system of claim 4 wherein the charged multidentate linking ligands include a sufficient number of aromatic rings that the storage system is capable of storing from 10 to 100 carbon dioxide molecules per formula unit of the metal-organic framework.

10. The carbon dioxide storage system of claim 4 wherein the charged multidentate linking ligands include a sufficient number of aromatic rings that the storage system is capable of storing from 15 to 60 carbon dioxide molecules per formula unit of the metal-organic framework.

11. The carbon dioxide storage system of claim 4 wherein the charged multidentate linking ligands include a sufficient number of aromatic rings that the storage system is capable of storing from 20 to 50 carbon dioxide molecules per formula unit of the metal-organic framework.

12. The carbon dioxide storage system of claim 4 wherein the charged multidentate linking ligands include a sufficient number of aromatic rings that the metal-organic framework has a surface area of at least 2000 $m^2/g$.

13. The carbon dioxide storage system of claim 4 wherein the charged multidentate linking ligands include a sufficient number of aromatic rings that the metal-organic framework has a surface area from about 2000 to 10000 $m^2/g$.

14. The carbon dioxide storage system of claim 4 wherein each metal cluster comprises 2 or more metal ions and each ligand of the plurality of multidentate ligand includes 2 or more carboxylates.

15. The carbon dioxide storage system of claim 4 wherein the metal ion selected from the group consisting of Group 1 through 16 metals of the IUPAC Periodic Table of the Elements including actinides, and lanthanides, and combinations thereof.

16. The carbon dioxide storage system of claim 4 wherein the metal ion selected from the group consisting of $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, and combinations thereof.

17. The carbon dioxide storage system of claim 4 wherein the metal cluster has formula $M_mX_n$, where M is metal ion, X is selected from the group consisting of Group 14 through Group 17 anion, m is an integer from 1 to 10, and n is a number selected to charge balance the metal cluster so that the metal cluster has a predetermined electric charge.

18. The carbon dioxide storage system of claim 7 wherein the metal-organic framework further comprises a non-linking ligand.

19. The carbon dioxide storage system of claim 1 wherein the metal-organic framework further comprising a guest species.

20. The carbon dioxide storage system of claim 4 wherein at least one multidentate linking ligand has 12 or more atoms that are incorporated in aromatic rings or non-aromatic rings.

21. The carbon dioxide storage system of claim 4 wherein the plurality of charged multidentate linking ligands comprise a ligand selected from the group consisting of ligands having formulae 1 through 21:

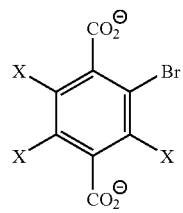

1

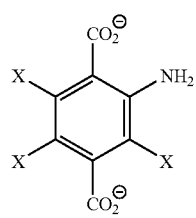

2

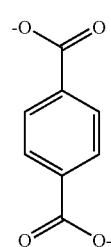

3

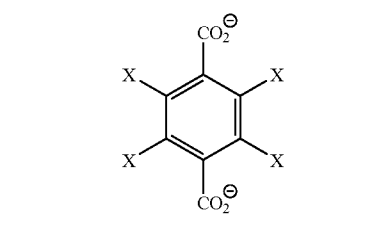

4

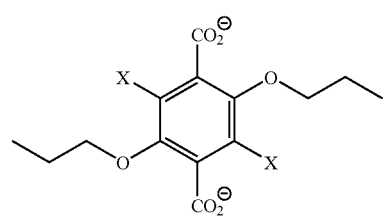

5

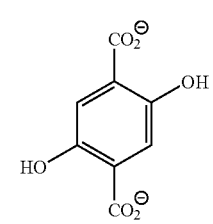

6

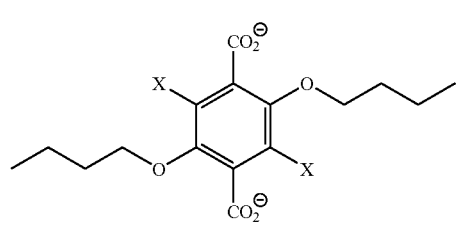

7

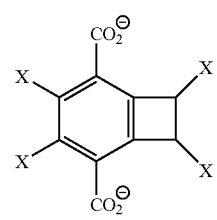

8

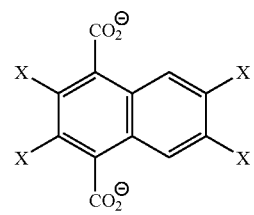

9

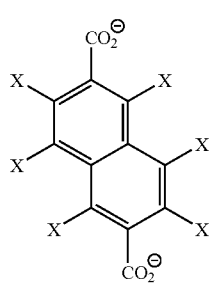

10

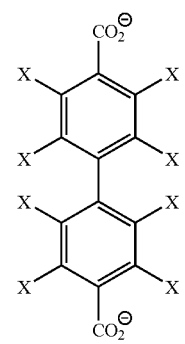
11
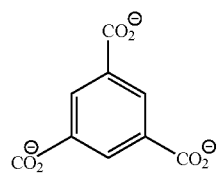
12
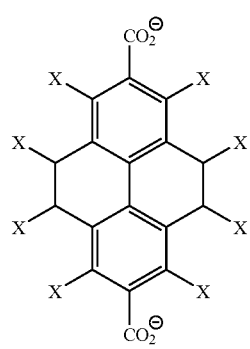
13
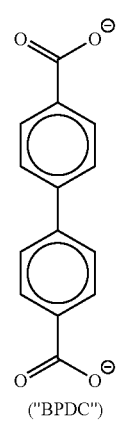
("BPDC")
14
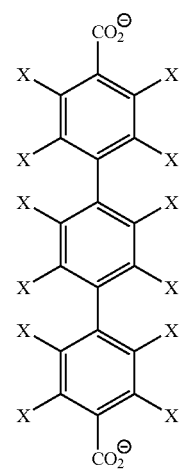
15
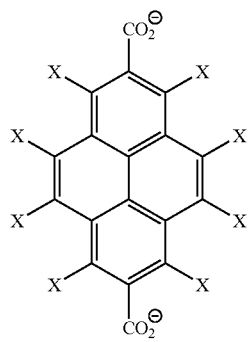
16
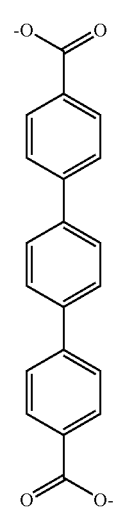
17

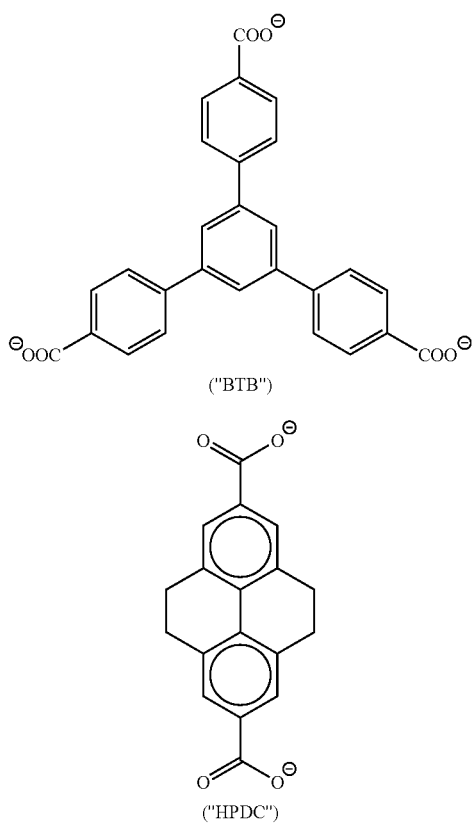

("BTB")

("HPDC")

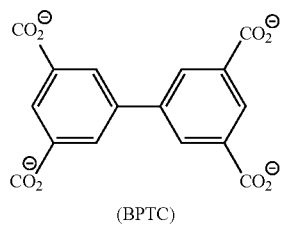

(BPTC)

wherein X is hydrogen, —NHR, —N(R)$_2$, halides, $C_{1-10}$ alkyl, $C_{6-18}$ aryl, or $C_{6-18}$ aralky, —NH$_2$, alkenyl, alkynyl, —Oalkyl, —NH(aryl), cycloalkyl, cycloalkenyl, cycloalkynyl, —(CO)R, —(SO$_2$)R, —(CO$_2$)R —SH, —S(alkyl), —SO$_3$H, —SO$^{3-}$M$^+$, —COOH, —COO$^-$M$^+$, —PO$_3$H$_2$, —PO$_3$H$^-$M$^+$, —PO$_3^{2-}$M$^{2+}$, or —PO$_3^{2-}$M$^{2+}$, —NO$_2$, —CO$_2$H, silyl derivatives; borane derivatives; and ferrocenes and other metallocenes; M is a metal atom, and R is $C_{1-10}$ alkyl.

22. An automobile exhaust system comprising the carbon dioxide storage system of claim 1.

23. A power plant exhaust system comprising the carbon dioxide storage system of claim 1.

\* \* \* \* \*